Sept. 2, 1969          R. W. STOUT          3,464,388

GNOTOBIOTIC SYSTEMS

Filed March 6, 1967          10 Sheets-Sheet 1

INVENTOR
RODNEY W. STOUT
BY
Robert J. Schaap
ATTORNEY

INVENTOR
RODNEY W. STOUT
BY
Robert J. Schaap
ATTORNEY

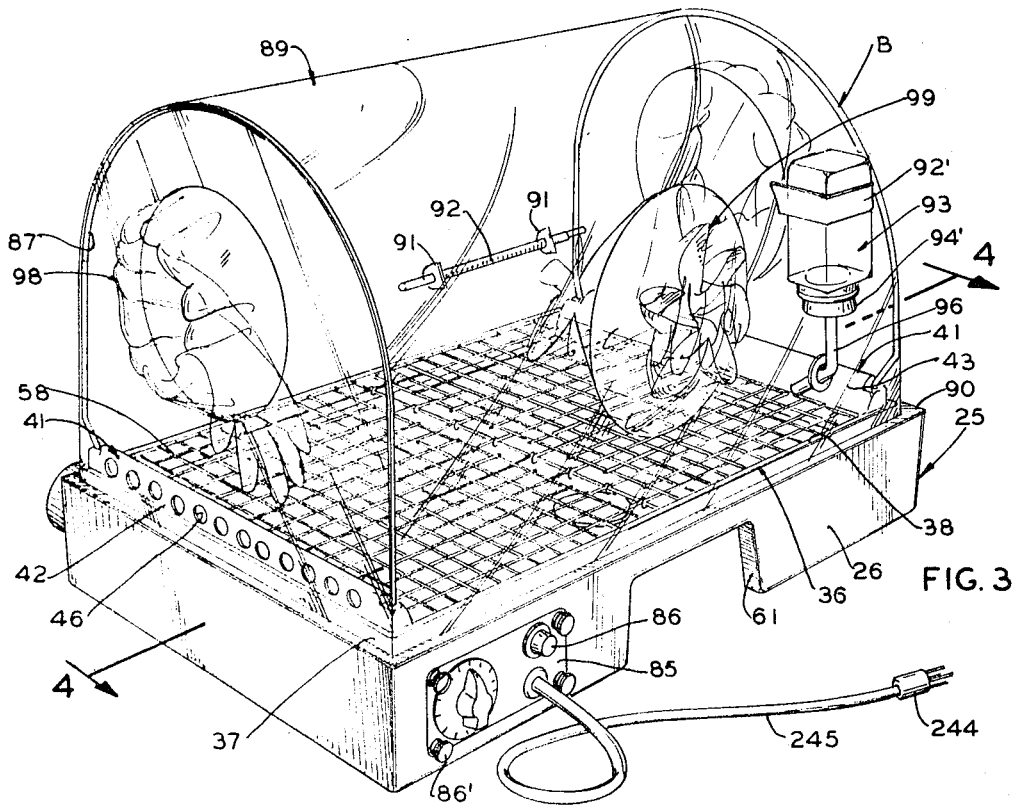
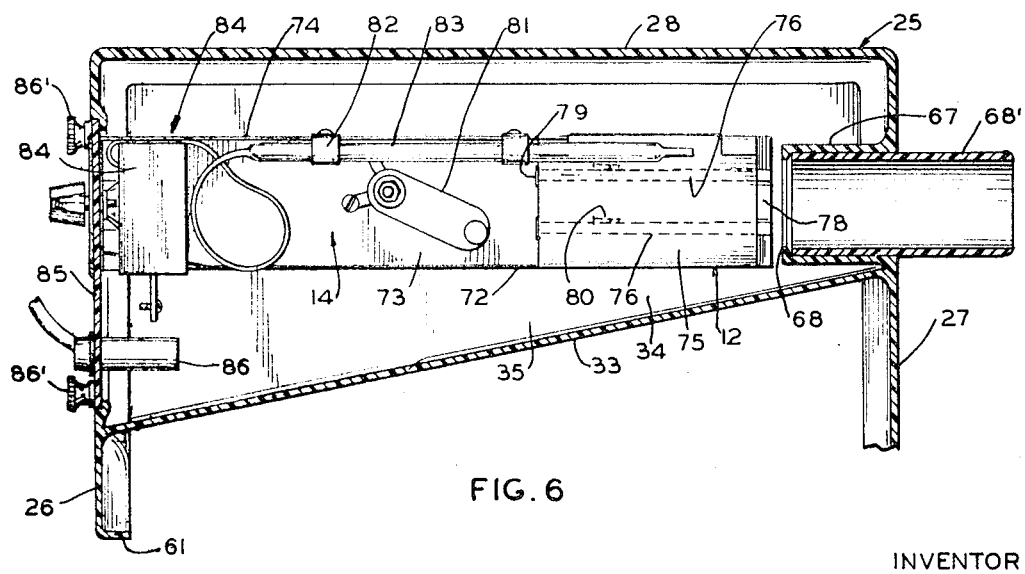

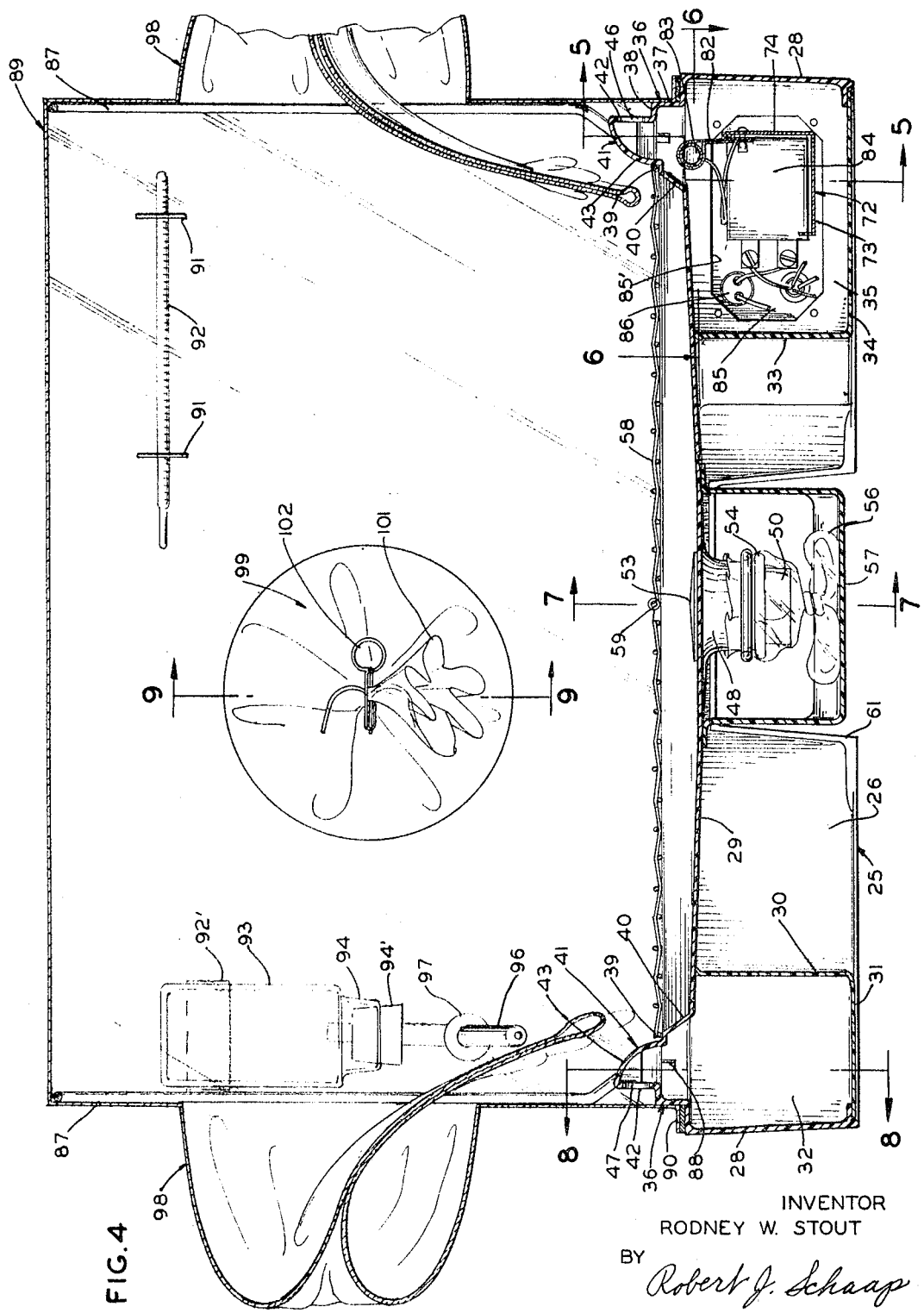

INVENTOR
RODNEY W. STOUT
BY
Robert J. Schaap
ATTORNEY

Sept. 2, 1969   R. W. STOUT   3,464,388
GNOTOBIOTIC SYSTEMS
Filed March 6, 1967   10 Sheets-Sheet 6

INVENTOR
RODNEY W. STOUT
BY
Robert J. Schaap
ATTORNEY

Sept. 2, 1969 R. W. STOUT 3,464,388
GNOTOBIOTIC SYSTEMS
Filed March 6, 1967 10 Sheets-Sheet 7

INVENTOR
RODNEY W. STOUT
BY
*Robert J. Schaap*
ATTORNEY

INVENTOR
RODNEY W. STOUT
BY
Robert J. Schaap
ATTORNEY

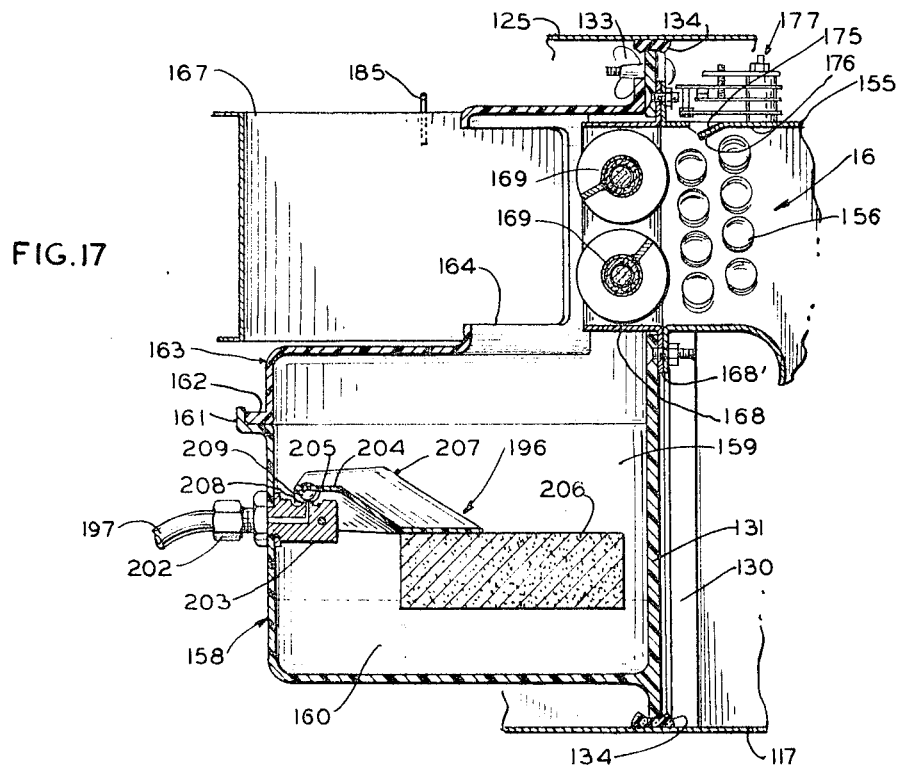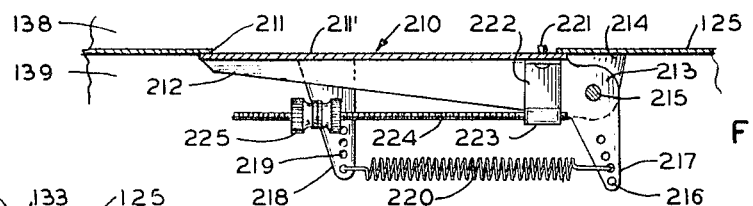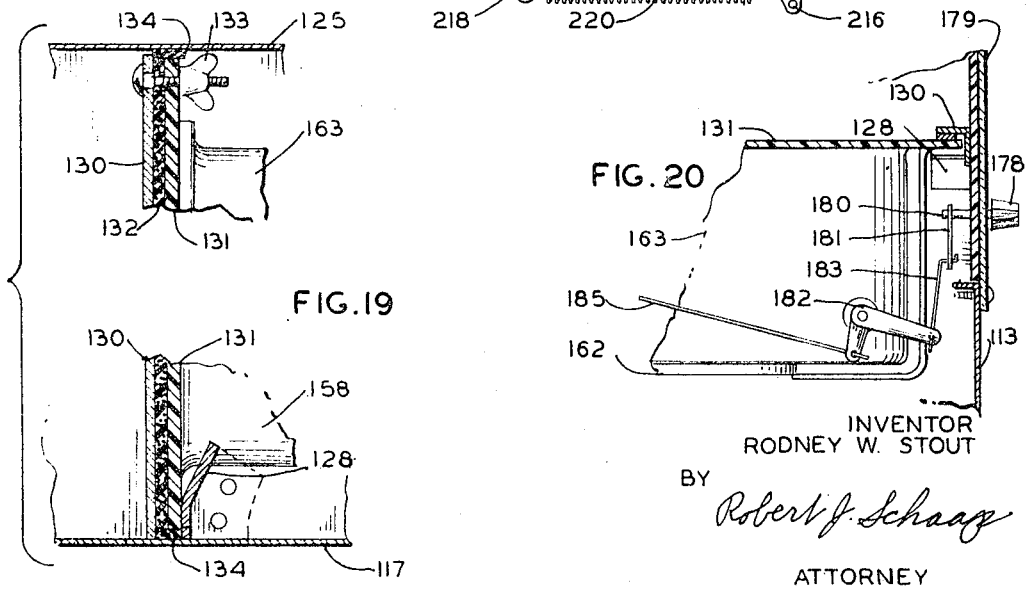

Sept. 2, 1969  R. W. STOUT  3,464,388
GNOTOBIOTIC SYSTEMS
Filed March 6, 1967  10 Sheets-Sheet 10

INVENTOR
RODNEY W. STOUT
BY
Robert J. Schaap
ATTORNEY

United States Patent Office 3,464,388
Patented Sept. 2, 1969

3,464,388
GNOTOBIOTIC SYSTEMS
Rodney W. Stout, 211 Cheney,
Webster Groves, Mo. 63119
Filed Mar. 6, 1967, Ser. No. 620,843
Int. Cl. A01k 1/00, 31/00; B01d 47/00
U.S. Cl. 119—15                               40 Claims

ABSTRACT OF THE DISCLOSURE

A gnotobiotic system which includes a plurality of animal incubators which can serve as isolators, and an atmosphere generator for delivering air of temperatures and humidity controlled conditions to the incubators. Each of the incubators has individual control systems and the generator includes a central control system operatively connected to the individual control systems. The incubator includes a double walled sleeve providing entry thereinto and a shiftable valve for removing excretia therefrom. The incubator is constructed for unitary removal of all electrical components for sterilization. An exhaust air removal system may be optionally provided.

---

This invention relates in general to certain new and useful improvements in gnotobiotic systems, and more particularly, to environmental control systems for small animals and the like.

The relatively recent science of gnotobiotics which relates to the raising of small animals under carefully controlled conditions has been the subject of greatly increased interest in recent years. This is particularly true in the fields of medical research where small animals such as mice, rabbits, monkeys and the like have been used in medical research experiments. Gnotobioticians have recently discovered that it is desirable to raise animals which are ultimately to be used in medical investigations, under carefully controlled conditions shortly after birth. When the animals are raised under conditions of germ free environments or under environments which contain selected germ contents, the possibility of conducting a carefully controlled experiment without atmosphere alienation of undesirable germ conditions is greatly increased.

A number of the animals under investigation may be housed in one room or at least in an area where a number of the animals live in the same atmospheric environment. Many of the animals may be injected with a virus or bacteria which is designed to induce certain conditions which are the subject matter of investigation in the animal. For example, an animal may be injected with a virus to create a cancerous tumor so that the effects of the tumor on the animal and any treatments therefor under investigation may be studied. Generally, a number of animals may be injected with the same virus so that a sufficiently large statistical population may be obtained in the investigation.

However, it has been found that when all of the animals are housed in the same environment, one animal may become the contagion of another. This type of condition materially interferes with the controlled conditions of the experiment, and prevents the examination of a particular animal under an isolated condition permitting interfering parameters to affect the experiment.

In order to overcome this problem, many gnotobioticists have resorted to the use of incubators designed for human children. However, these incubators have proved to be wholly inadequate for a number of reasons. Incubators for human babies are quite expensive and a sufficient number of these incubators to house all of the animals being tested presents a considerable cost drain on a research budget. Furthermore, incubators designed for children are too large for housing of small animals. In addition to this fact, the incubators for human infant children are not designed to create the same conditions which are necessary for other types of animals. In the case of human babies, the infant child may be removed from the incubator for a period of time such as during feeding periods and times for cleaning the incubators. In many controlled medical experiments, it is undesirable to remove the animal from the incubator for prolonged periods of time. Aside from the above, the incubators presently available for human infant children are not adaptable for use with small nonhuman animals.

Many of the laboratories in which experiments are carried out with small animals oftentimes do not contain the necessary apparatus or utilities to create the desired environment for small animals. When these institutions attempted to use incubators designed for human infant children, there was a lack of a proper apparatus to create the necessary conditions in the incubator. Furthermore, there was no provision for eliminating the air which was expelled from the incubator. This air was generally expelled to the atmosphere of the room and the same air was carried into the intake of another incubator, carrying therewith the impurities in the air of the first incubator. Accordingly, the human incubators did not provide a satisfactory solution to the problem of housing small animals in conditions of controlled environment.

OBJECTS

It is, therefore, the primary object of the present invention to provide a gnotobiotic system which is capable of housing a number of small animals under selected controlled conditions, preventing the animals from being subjected to undesirable conditions in an external atmosphere.

It is another object of the present invention to provide a gnotobiotic system of the type stated which is designed to prevent one animal from being affected by undesirable germ conditions of another animal.

It is an additional object of the present invention to provide a gnotobiotic system of the type stated which is capable of housing a large number of animals in an atmosphere with selected conditions and yet atmospherically isolate each animal from every other animal.

It is a further object of the present invention to provide a gnotobiotic system of the type stated which incorporates sufficient safety mechanisms to prevent injury to any of the animals being housed therein, in the event of inadvertent improper operation of the system.

It is also an object of the present invention to provide a gnotobiotic system of the type stated which includes an internal atmosphere generating system and, therefore, does not require the necessity of additional atmosphere generating equipment.

It is another salient object of the present invention to provide a gnotobiotic system of the type stated which is relatively economical to manufacture and operate and which can be built into a compact unit, which is also easily transportable.

It is yet another object of the present invention to provide a gnotobiotic system of the type stated which requires a minimum amount of manual attention.

With the above and other objects in view, my invention resides in the novel features of form, construction, arrangement and combination of parts presently described and pointed out in the claims.

FIGURES

In the accompanying drawings (10 sheets):

FIGURE 3 is a perspective view of an incubator forming part of the gnotobiotic system of FIGURE 1 and which is constructed in accordance with and embodies the present invention;

FIGURE 4 is a vertical sectional view taken along line 4—4 of FIGURE 3;

FIGURE 6 is a horizontal fragmentary sectional view taken along line 6—6 of FIGURE 4;

Figure 1:
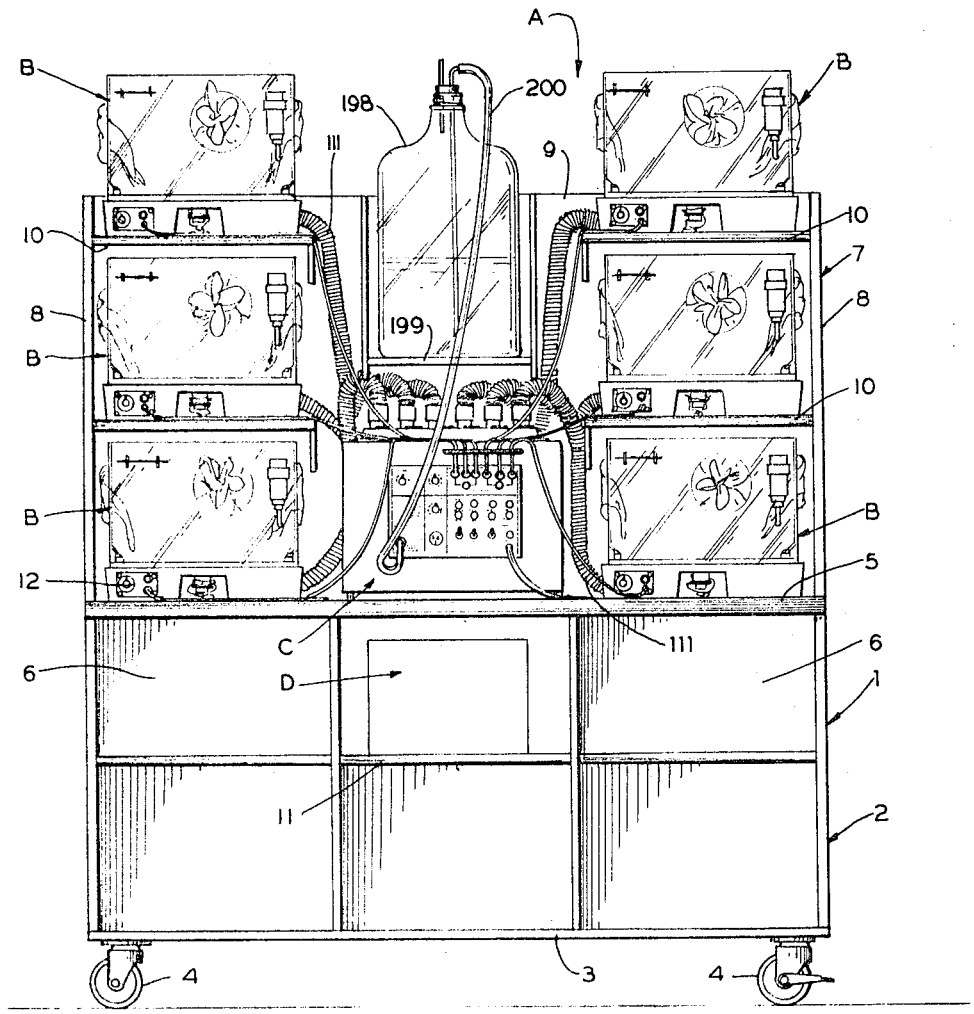
FIGURE 1 is a front elevational view of a gnotobiotic system which is constructed in accordance with and embodies the present invention.
Figure 21:
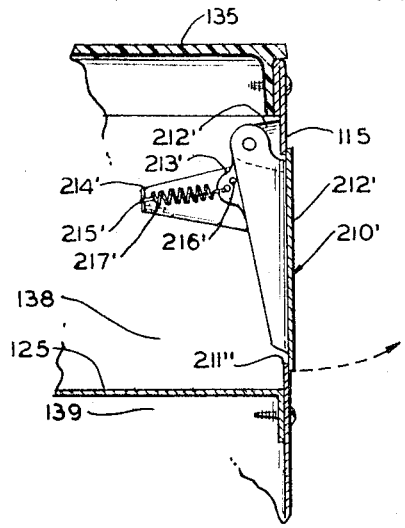
Figures 2, 25:
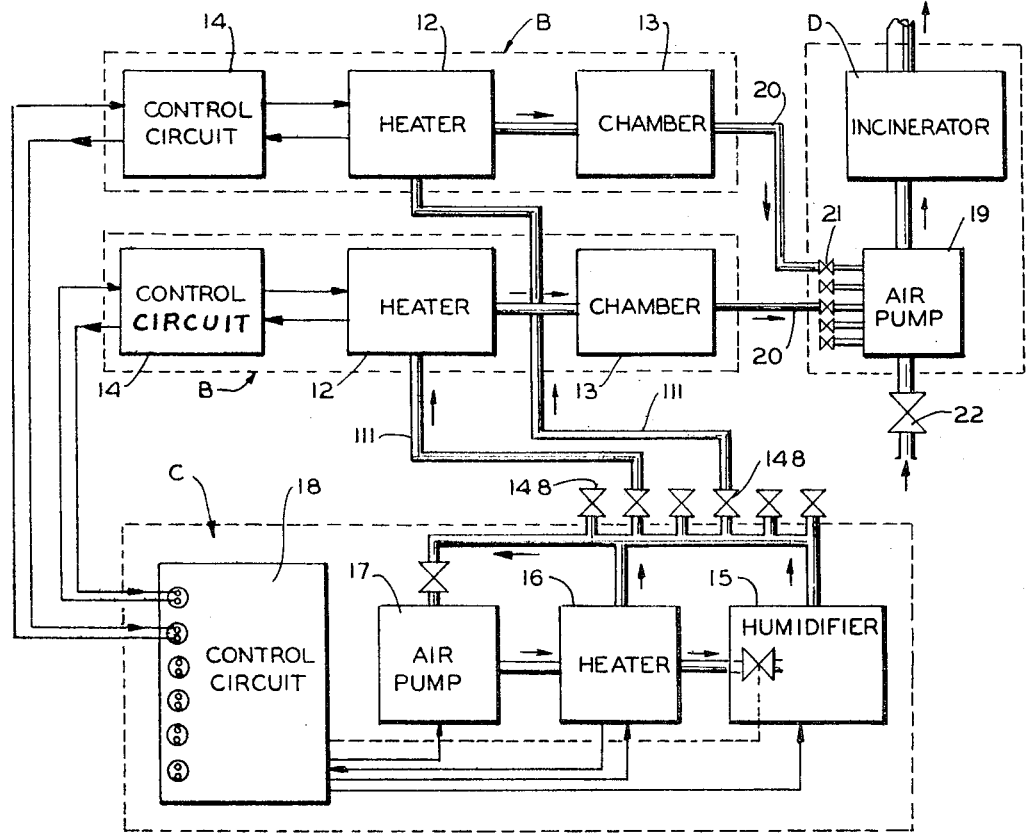
FIGURE 2 is a schematic view illustrating the functional relationship of the components forming the gnotobiotic system of FIGURE 1.
Figure 7:
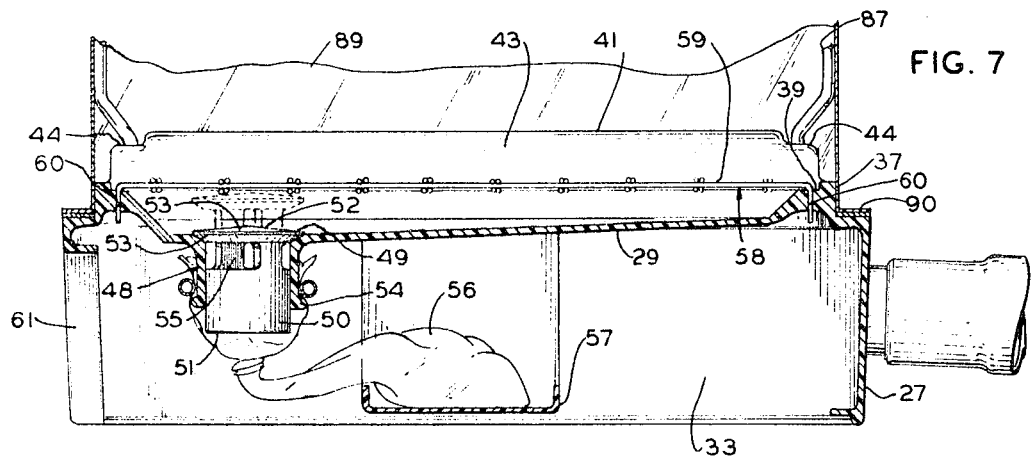
Figure 8:
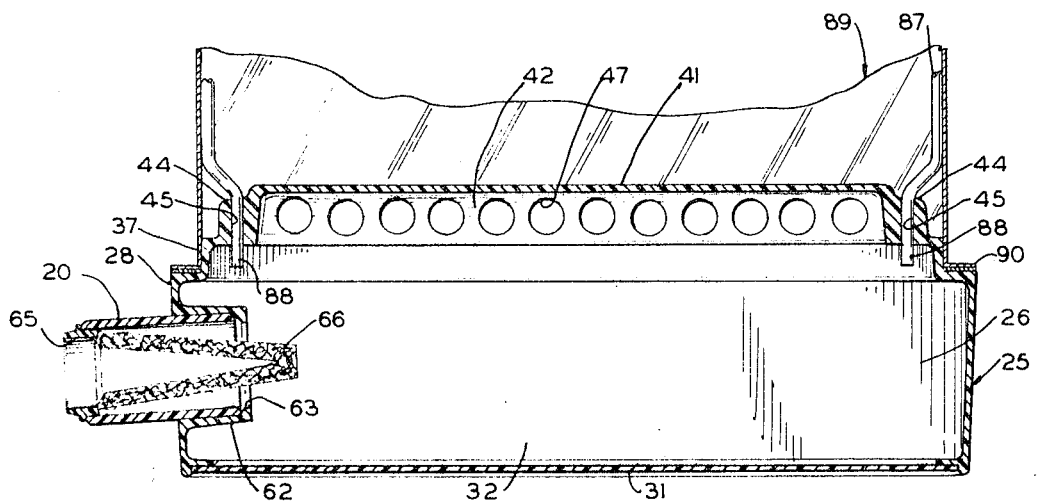
Figure 9:
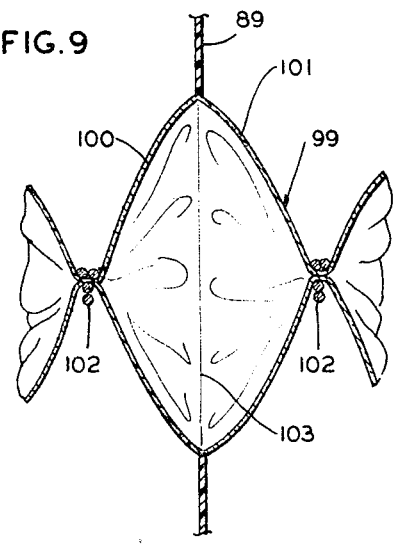
Figure 23:
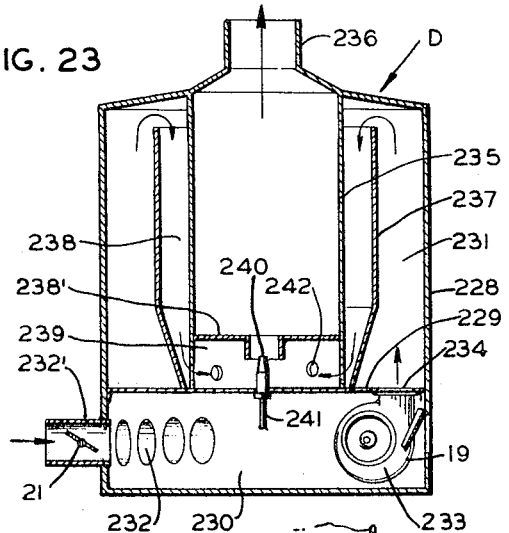
Figure 10:
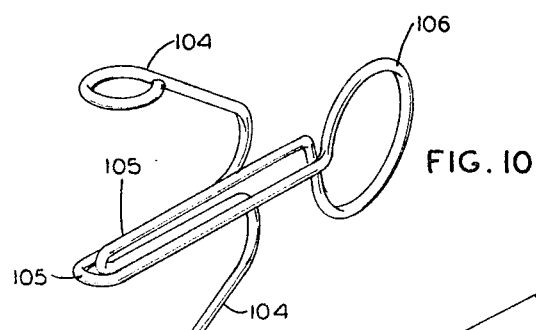
Figure 12:
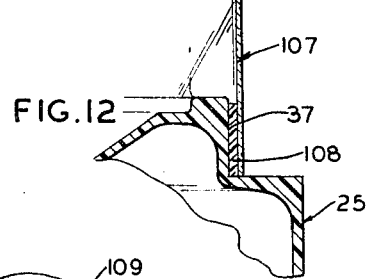
Figure 11:
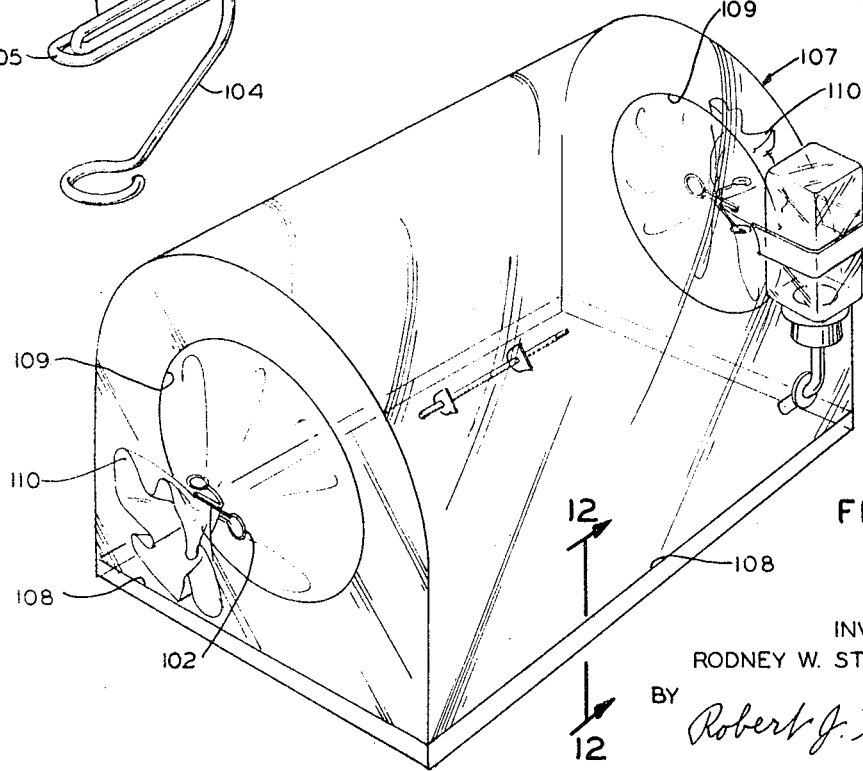
Figure 13:
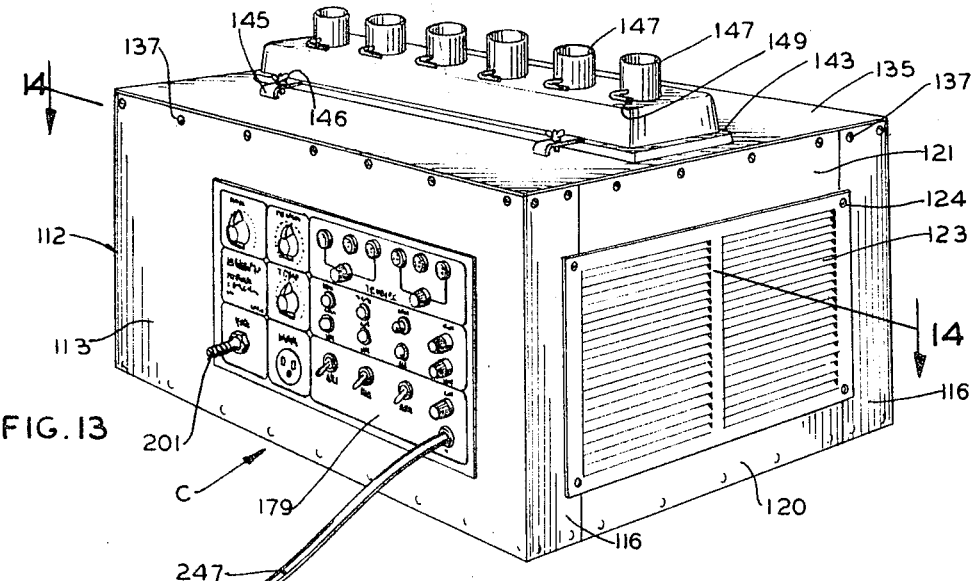
Figure 14:
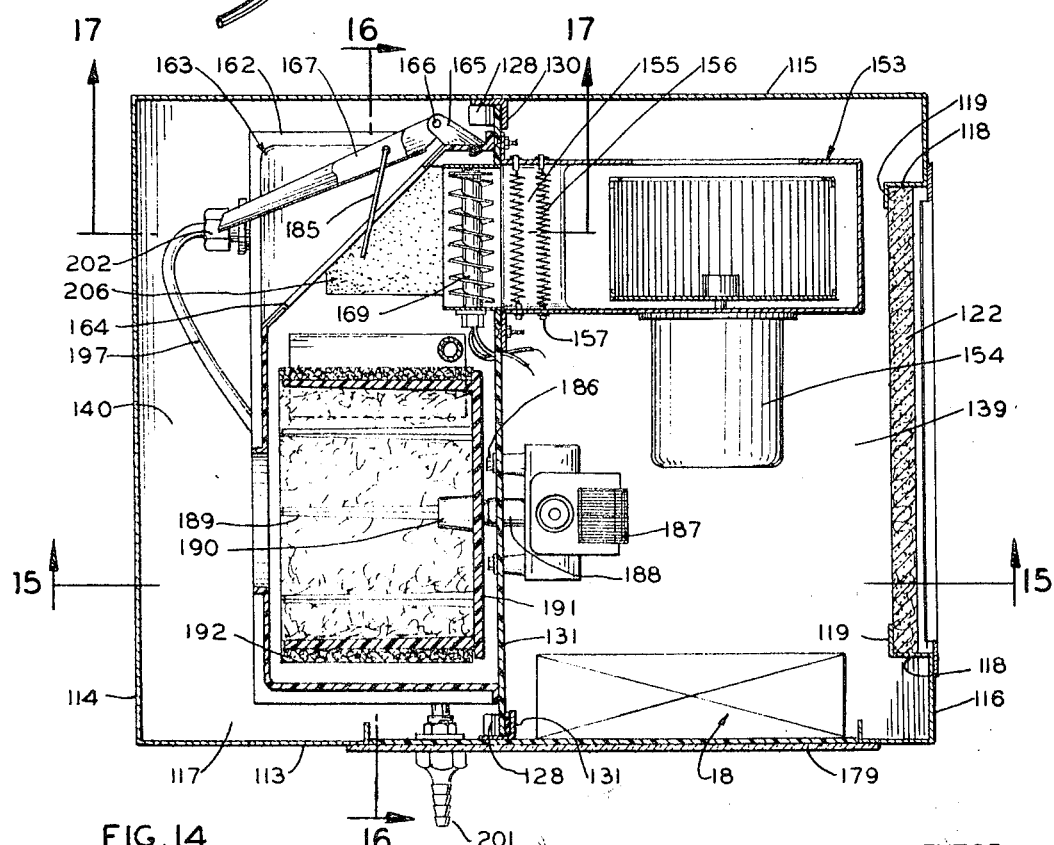
Figure 15:
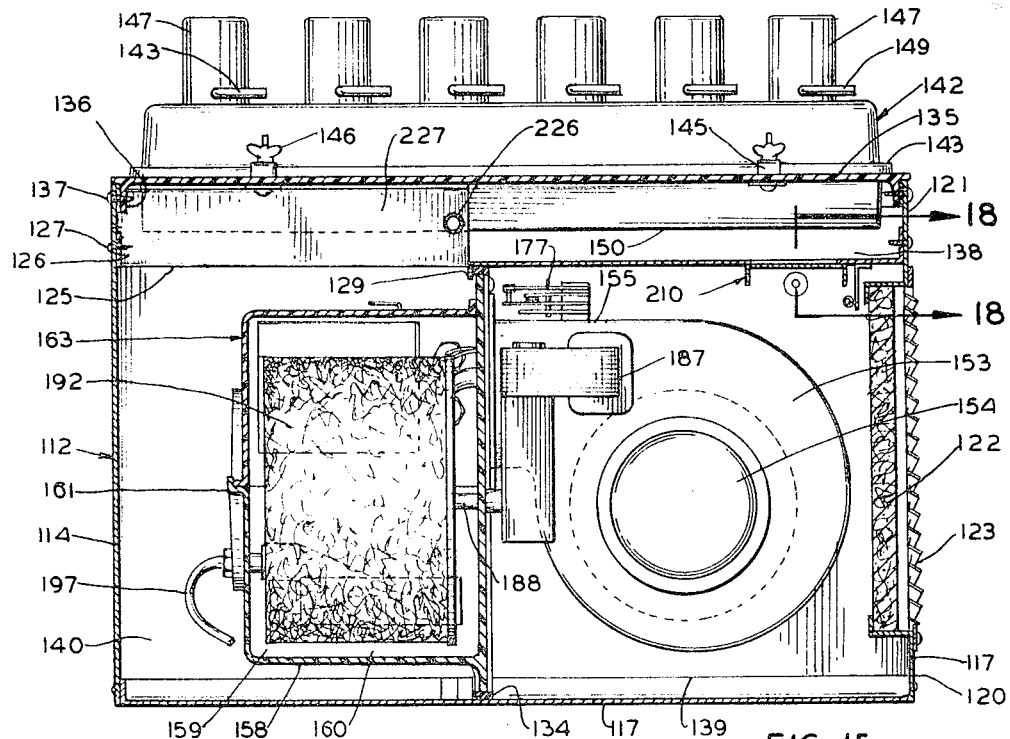
Figure 16:
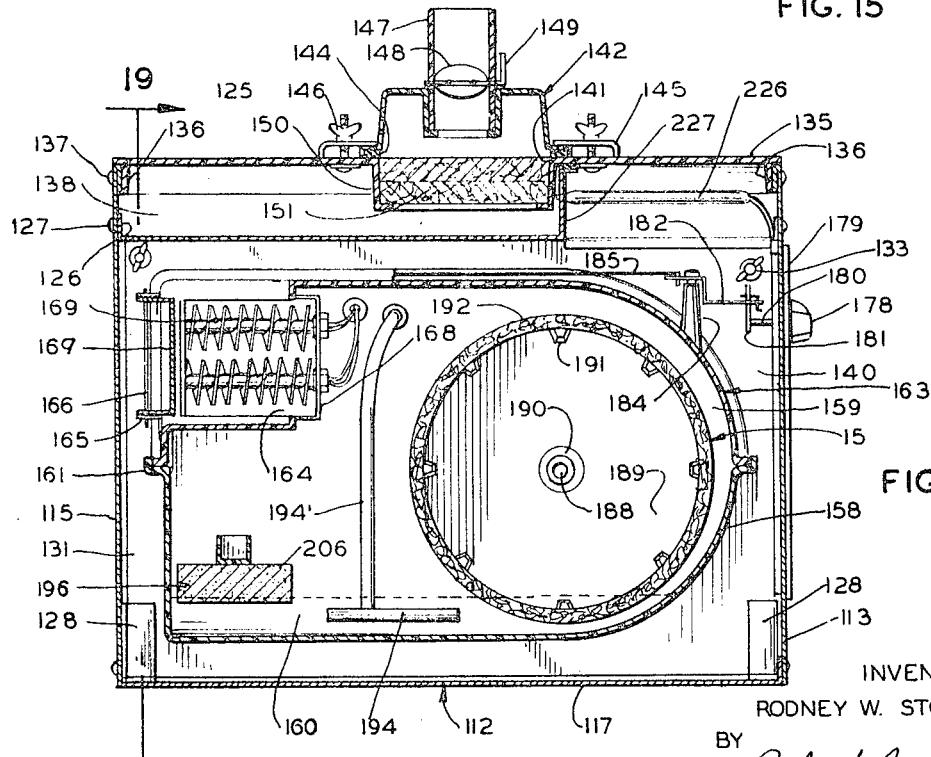
Figure 22:
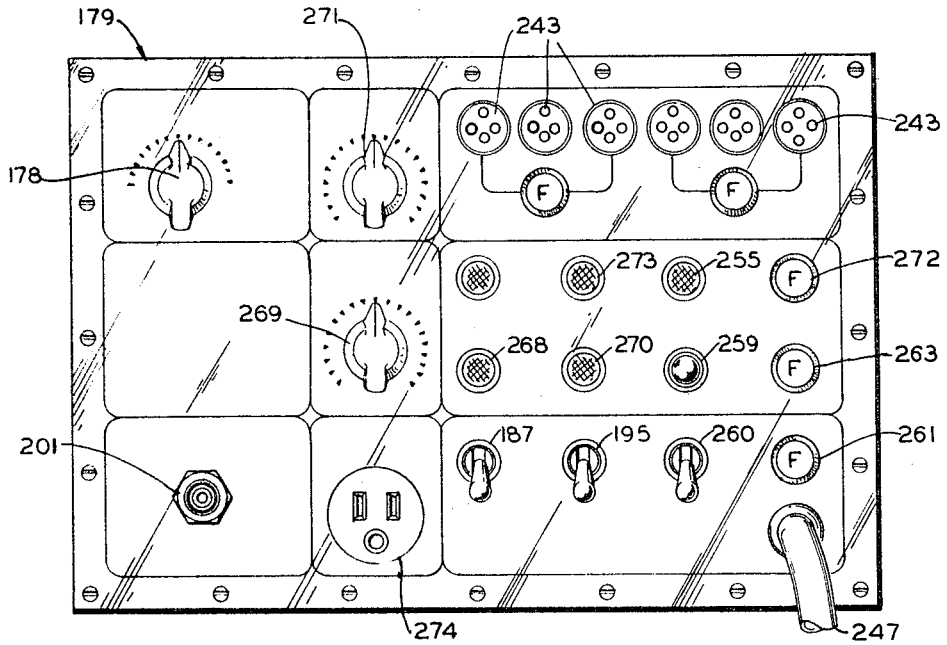
Figure 24:
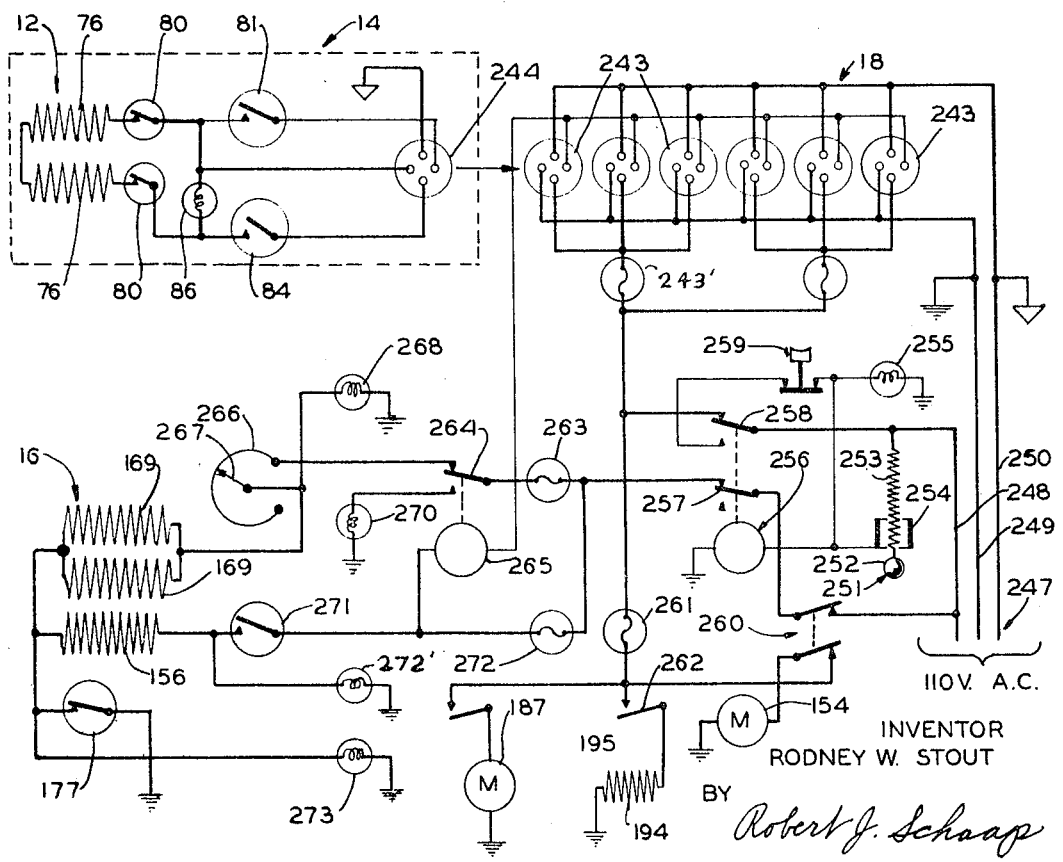

FIGURES 7 and 8 are vertical fragmentary sectional views taken along lines 7—7 and 8—8 respectively, of FIGURE 3;

FIGURE 9 is a fragmentary sectional view taken along line 9—9 of FIGURE 4 illustrating the double-walled sleeve in the incubator of the present invention;

FIGURE 10 is a perspective view of a clamp used in the double-walled sleeve of FIGURE 9;

FIGURE 11 is a perspective view of a modified form of canopy used in the incubator of the present invention;

FIGURE 12 is a fragmentary sectional view taken along line 12—12 of FIGURE 11;

FIGURE 13 is a perspective view of an atmosphere generator constructed in accordance with and embodying the present invention and which forms part of the gnotobiotic system of FIGURE 1;

FIGURE 14 is a horizontal sectional view taken along line 14—14 of FIGURE 13;

FIGURES 15 and 16 are vertical sectional views taken along lines 15—15 and 16—16 respectively, of FIGURE 14;

FIGURE 17 is a fragmentary vertical sectional view taken along line 17—17 of FIGURE 14;

FIGURE 18 is a fragmentary sectional view taken along line 18—18 of FIGURE 15;

FIGURE 19 is a vertical sectional view, partially broken away, taken along line 19—19 of FIGURE 16;

FIGURE 20 is a fragmentary sectional view showing the link actuating control mechanism which operates the humidity control valve in the atmosphere generator of FIGURE 13;

FIGURE 21 is a modified form of pressure relief valve in the atmosphere generator and which is constructed in accordance with and embodies the present invention;

FIGURE 22 is a front plan view of the control panel forming part of the atmosphere generator of FIGURE 13;

FIGURE 23 is a vertical sectional view of an incinerator forming part of the gnotobiotic system of the present invention;

FIGURE 24 is a schematic view of the electrical circuitry forming part of the gnotobiotic system of the present invention; and FIGURE 25 is a perspective view of a modified form of gnotobiotic system constructed in accordance with and embodying the present invention.

GENERAL DESCRIPTION

Generally speaking, the present invention relates to an apparatus for housing a plurality of small animals in conditions of controlled environment. The apparatus described herein was designed with a size to accommodate small monkeys; but it should nevertheless be understood that the apparatus is capable of accommodating other small animals such as rodents, rabbits and the like.

The apparatus of the present invention is comprised of three major units which may be designated as the incubator, the atmosphere generator and the incinerator. A complex control system is provided and provides an interconnection between the three aforementioned major components. The control system is integrated with and actually forms a part of these major units and these units coact as an entire unitary system.

The apparatus includes a transportable cart which is provided with casters for movement thereof. The cart includes a plurality of supporting shelves for housing a plurality of incubators. The drawings illustrate six distinct incubators, though it should nevertheless be understood that the cart may be provided with suitable shelves for supporting any desired number of incubators. The incubators comprise a housing with a wire mesh floor for supporting the animal. A trough for receiving the excretions of the animal is disposed beneath the wire mesh floor. The trough is also provided with a valve which is manually operable for removing the excretion from the trough. A disposable bag for accumulating the excretory matter is connected to the opening in the trough and is tied in such manner that the valve to the trough may be closed before the bag is opened to receive the matter in the trough. The incubator is also provided with a plenum chamber on its underside for receiving prepared air. The incubator is also provided with a heater and an individual control for each heater. A thermostat is provided for regulating the temperature of the air before it is admitted into the chamber of the incubator.

A removable and disposable cover is secured to the housing thereby forming an internal compartment in the incubator for housing the animal. The housing is also provided with a series of air inlet apertures opening into the internal compartment and a series of outlet apertures for removing the air. In this manner, fresh air which has been preconditioned, is continuously circulated through the compartment. A water bottle is secured to the external surface of the cover and is provided with a tube which communicates with the interior of the compartment providing a source of drinking water for the animal. The cover is also provided with a pair of hand gloves formed therein for manipulating the baby animal in the compartment. Furthermore, a double-walled sleeve is provided in the form of a double valve for placing food and other necessary items in the compartment without exposing the compartment to the external atmosphere. A modified form of cover with apertures on each side is provided where it is desired to provide incubation but not necessarily isolation.

Each of the incubators in the system is connected to an atmosphere generator for receipt of preconditioned air to be circulated through the incubator chamber. The generator is provided with a control circuit to condition the air according to preselected control parameters necessary for the controlled environment. However, it is often necessary to establish slightly different conditions for each of the individual animals. Each of the incubators is therefore provided with its own internal control circuit. This latter control circuit is adapted to vary the humidity and temperature conditions of the incubator with which it is associated.

The spent air from each of the incubators is pumped to an incinerator where the air is incinerated for the destruction of any impurities absorbed in the chambers of the various incubators. The incinerator is a self-contained unit and is also mounted on the cart.

The atmosphere generator is similarly mounted on the transportable cart and is also a partial self-contained unit. The generator is subdivided into a plurality of chambers and being located in one of the chambers is a humidity control device which serves as humidifier. The humidity control device includes a rotatable wheel which has a water porous surface and which is rotatable in a water trough. Air from a blower chamber is forced past the wheel for adsorbing water in the water porous surface of the wheel. Air from the blower chamber is also forced past a heating element in another chamber for heating the air to the desired temperature. A swingable door which serves as a valve provides for the mixing of the desired quantities of the humid air and the heated air in a third chamber. The mixed air is then transferred to a plenum chamber where it is then transferred to the individual incubators.

A thermostat is operatively disposed in the pathway of the air in the plenum chamber for providing desired temperature control of the air to be transferred to the incubators. A valve door is also operatively interposed between the plenum chamber and the blower chamber for maintaining a constant volume of air to be transferred to the individual incubators. The door is weighted to the open position and biased to the closed position. If one or more of the incubators in the system is not being used or is otherwise closed to the input air, then a back pressure is caused in the plenum chamber causing the door to shift more to the open position preventing an increase of air from leaving the incubators and thereby avoiding draft conditions in any individual incubator. This extra quantity of air is then recycled in the atmosphere generator.

A control circuit which integrates the atmosphere generality of plug-in jacks and each of the incubators is provided. The atmosphere generator is provided with a plurality of plug-in jacks and each of the incubators is provided with jacks for insertion thereinto. The control circuit includes a tilt mechanism, which is designed to energize the electrical components of the atmosphere generator, is tilted beyond a preselected angle. The control circuit also includes a resetting mechanism for reenergizing each of the aforementioned components when the generator is again allowed to sit in an upright position. The control circuit also includes a rheostat, thermostat combination in the atmosphere generator for providing close temperature control of the air which is to be transferred to each of the incubators. In addition, the control circuit includes an overheat relay for deenergizing the heaters in the atmosphere generator if the temperature should exceed a preselected temperature. The control circuit also includes a series of indicator lights which are mounted on a control panel, which is in turn located on the atmosphere generator. These indicator lights include a generator overheat light, an incubator overheat light, a tilt indicator lig,ht and a pair of lights which are energized when the heaters are energized.

Each of the incubators has its own individual control circuit which is integrated into the generator control circuit. The incubator control circuit includes the thermostats previously described for maintaining close temperature control in the compartment of each incubator. Furthermore, the incubator control circuit includes an indicator light which is energized when the incubator is in operation.

As indicated above, the science of gnotobiotics is a relatively recent science and a specific definition thereof has not been well established. However, the science deals with the study of organisms or of a species when other organisms or species are absent or when another present organism is known. This term has also been used as applied to the study of gnotobiotics or germ free animals. A somewhat detailed discussion of this recent technology appears in the Encyclopedia of the Biological Sciences, by Peter Gray, 1961 edition, pages 446–448. For the purposes of the present invention, the term "gnotobiotics" is defined to mean the rearing and study of small animals in conditions of controlled environment whether or not in an organism free atmosphere.

DETAILED DESCRIPTION

Referring now in more detail and by reference characters to the drawings which illustrate practical embodiments of the present invention, A designates an incubator system which is schematically illustrated in FIGURE 2 and is structurally illustrated in the front elevational view of FIGURE 1. The incubator system A generally comprises a transportable cart 1 including an outer frame 2 and a base plate 3. Secured to the underside of the base plate 3 are four conventional casters 4 which are spaced and located at the corners of the base plate 3 and one or more of the casters 4 may be provided with a conventional locking mechanism for locking the cart in a desired position.

Rigidly secured to the upper margins of the frame 2 is a top plate 5 forming a plurality of internal compartments 6 in the frame 2 for housing any necessary auxiliary apparatus. Welded or otherwise rigidly secured to the top plate 5 is a support frame 7 having a pair of transverse side plates 8 and a back plate 9 as illustrated in FIGURE 1. Rigidly secured to the pack plate 9 and the side plates 8 are pairs of vertically spaced support shelves 10.

Disposed on the upper surface of the top plate 5 are a pair of incubators B and similarly disposed on each of the support shelves 10 are similar incubators B. While the cart 1 has been illustrated with a total of six incubators B, it should be recognized that the cart could be designed to hold any desired number of incubators. Also disposed on the upper surface of the top plate 5 is an atmosphere generator C which is connected both electrically and pneumatically to the individual incubators B in a manner hereinafter described in more detail. Also secured to the outer frame 2 in any conventional manner is an intermediate shelf 11 for supporting an incinerator D which is also electrically and pneumatically connected to the incubators B in a manner hereinafter described in more detail.

The schematic illustration of FIGURE 2 shows the functional inter-relationship between each of the aforementioned major components. Each of the incubators B is individually provided with a heating mechanism 12 and an atmospherically controlled chamber 13. Furthermore, each of the incubators B is provided with an individual control mechanism including an internal control circuit 14. The atmosphere generator generally includes a humidity control device 15 and a heating mechanism 16. The atmosphere generator C also includes an air supply mechanism 17 and an overall controll mechanism including a major control circuit 18.

Each of the atmospherically controlled chambers 13 of each of the incubators B is pneumatically connected to a conventional air pump 19 through exhaust tubes 20 for forcing the spent air from the chambers 13 to the incinerator D. The air pump 19 includes an exhaust manifold with an individual manually operated valve 21 for connection to each of the exhaust tubes 20. The air pump 19 is also provided with a conventional pressure relief valve 22. The relief valve 22 may be designed to close on negative pressure and open on an excess positive pressure condition. In like manner, the pressure relief valve 22 may be designed to open on negative pressure conditions in the chamber 13 and close on excess positive pressure conditions in the chambers 13, since negative pressures are sometimes desired in the atmospherically controlled chambers 13 in gnotobiotics.

The air supply mechanism 17 of the atmosphere generator C is pneumatically connected to the heating mechanism 16 which is in turn pneumatically connected to the humidity control device 15. The air supply mechanism 17 is also functionally connected to the humidity control device 15 individually and to the heating mechanism 16 individually, and is in turn connected through a series of individual valves to the heating mechanism 12 of the incubators B.

The atmosphere generator is designed to provide a controlled atmosphere for small animals such as small monkeys. Each of the individual incubators B is connected both pneumatically and electrically to the atmosphere generator C and receives the preconditioned air to be circulated through the incubator chamber 13. The control circuit of the generator C is designed to provide the necessary control parameters such as temperature and humidity of the air to be delivered to each of the incubators B. The control circuits 14 of each of the incubators B are further designed to vary the control parameters to obtain air with the necessary conditions for that particular incubator B.

It is to be recognized that each of the aforementioned major components such as the individual incubators B, the atmosphere generator C and the incinerator D are integrated into a unitary structure and coact as an entire unitary system. These aforementioned components are both pneumatically and electrically connected in such manner that the operation of the system is an integrated one. However for purposes of clarity of description, these components will be described individually.

Incubator

The incubator B forming part of the gnotobiotic system A of the present invention is more specifically illustrated in FIGURE 3. Each of the incubators B in the gnotobiotic system A is identical and therefore only one incubator B is described and illustrated in detail herein. The incubator B generally comprises a base housing 25 having a forward or front wall 26, a rear wall 27 and left and right end walls 28. The housing 25 also has an integrally formed top wall 29, which is formed so that it converges downwardly toward the center and toward the forward margin thereof in the form of a trough. Extending between the front wall 26 and the rear wall 27 and being integrally formed therewith and with the top wall 29 is an intermediate wall 30. Enclosing the space formed by the intermediate wall 30 and right end wall 28 is a bottom wall 31 thereby forming an exhaust chamber 32. Also extending between the front wall 26 and the rear wall 27 and being integrally formed therewith and with the top wall 29 is another intermediate wall 33 which is spaced from the intermediate wall 30. Enclosing the space formed by the intermediate wall 33 and the left end wall 28 is a bottom wall 34 which forms a plenum chamber 35.

Integrally formed with the top wall 29 and being spaced slightly inward from the peripheral margins thereof, is an upstanding rectangularly shaped bead 36, which is also rectangular in cross section. The bead 36 is formed with a vertical side wall 37 and a flat horizontal top wall 38. Spaced below the top wall 38 is an inwardly extending relatively narrow horizontally disposed support wall 39 and integrally formed therewith is a downwardly and inwardly extending connecting wall 40 which integrally merges into the top wall 29. Integrally formed with the bead 36 along the two transverse ends thereof are a pair of upstanding air ducts 41 having outwardly facing vertical walls 42 which merge into inwardly and downwardly extending arcuate walls 43, the latter in turn merging into the horizontally disposed support wall 39. Each of the air ducts 41 is beveled to form flat walls 44 at the forward and rearward margins thereof and each of the flat walls 44 is drilled to form hook receiving apertures 45. The vertical wall 42 of the right air duct 41 is provided with a series of transversely spaced air apertures 46 which communicate with the plenum chamber 35. The vertical wall 42 of the left air duct 41 is also provided with a series of transversely spaced air apertures 47 which communicate with the exhaust chamber 32.

The base housing 25 may be molded as an integral structure or it may be vacuum formed in separate components and conventionally secured to form a unitary housing. The design of the base housing 25 lends itself to easy and economical fabrication. The housing 25 may be formed of any suitable synthetic resin or plastic material such as rigid polyethylene or polystyrene. Polyvinylchloride has also been found to be a suitable plastic for a material of construction of the base housing 25.

The top wall 29 of the base housing 25 is apertured at its low point and integrally formed with a downwardly extending tube 48. The top wall 29 is also beveled around the point of connection to the tube 48 in the form of a frusto-conically shaped valve seat 49. Disposed in the tube 48 and being vertically shiftable therein for a limited distance is a valve plug 50 which comprises a hollow tube 51 which concentrically fits within the tube 48. The tube 51 fits snugly but nevertheless slidably within the tube 48 in the manner as illustrated in FIGURE 4. The hollow tube 51 is integrally formed with a head 52 having a crowned top wall 53 which is disposed above the upper surface of the top wall 29 when the valve plug 50 is in the closed position. The head 52 is also formed with an annular frusto-conical seating surface 53 on its underside which matches the frusto-conical valve seat 49. Thus, when the valve plug 50 is in its closed position or seated position, that is, the position as illustrated in FIGURE 4, the seating surface 53 will engage the valve seat 49 thereby forming a substantially fluid-tight seal therebetween. The tube 51 is also formed with a pair of diametrically opposed substantially enlarged apertures 55 which are disposed below the top wall 29 when the valve plug 50 is in the seated position and are raised above or at least in alignment with the top wall 29 when the valve plug 50 is shifted to the open position.

The tube 48 is integrally formed with an outwardly extending flange 54 at its lower end and disposed around the tube 48 is a polyethylene disposable bag 56 which is adapted to receive the excreta of the animal in the incubator B. The bag 56 is designed to fit around the tube 48 and the flange 54 and may be retained thereon with a rubber band or piece of string or other suitable device, if desired. The bag 56 is preferably twisted or wound in the form of a knot so that the contents of the bag 56 is not exposed to the interior of the incubator B when the valve plug 50 is opened. The bag 56 may also be clamped, if desired, in order to prevent exposure of the bag contents to the interior of the incubator B. The bag 56 furthermore is disposed in the area between the two intermediate walls 30, 33. Inasmuch as the bags 56 are constructed of a lightweight polyethylene material, they are inexpensive to manufacture and, therefore, are disposable. Furthermore, the bags 56 may be impregnated or treated with a suitable conventional disinfectant. A tray or U-shaped bracket 57 may be secured to the underside of the top wall 29 for holding the bag 56.

A removable screen floor 58 is supported on the support walls 39 in the manner as illustrated in FIGURES 4 and 7. The screen floor 58 is constructed of a fairly rigid material and of substantially large gauge to support the weight of a small animal supported thereon. The entire exposed surface of the floor 58 is also preferably dipped in an epoxy resin or polyvinyl chloride. It has been found that polyvinyl chloride has disinfectant qualities and germicidal qualities. The screen floor 58 is preferably divided into two sections which are hinged on a transversely extending pin 59 which has a pair of downwardly extending pins at its ends. By further reference to FIGURE 7, it can be seen that the pins 59 extend into apertures 60 formed in the support walls 39. By means of this construction, it can be seen that one screen floor section can be raised about the pivot pin 59 in order to scoop the excreta of the animal toward the tube 48. In similar manner, the same screen section can be lowered and the other screen section can be raised in order to scoop the excreta on that side of the top wall 29 toward the tube 48. The valve plug 50 is next raised so that the excreta can be scooped into the bag 56 or washed into the bag 56, since the floor 29 is sloped toward the plug 50. Since the bag 56 is still wound, the excreta is deposited into the upper part of the bag 56 and the remaining contents of the bag 56 is not exposed to the atmosphere of the chamber 13. Thereafter, the valve plug 50 is shifted to the closed position and the bag 56 is unwound or clamped so the excreta in the upper part of the bag is permitted to fall into the lower part of the bag 56. The bag 56 is again wound or clamped. For performing this operation, the front wall 26 is cut away in the provision of an access aperture 61. The aperture 61 is sufficiently large so that a hand may be inserted therein for performing the above-described operation.

The rear wall 27 is integrally formed with a tubular sleeve 62 which extends into the exhaust chamber 32. Fitted within the sleeve 62 is the exhaust tube 20 which engages a flange 63 on the inner end of the sleeve 62. A filter assembly is provided with a supporting ring 65 for retaining an inwardly extending conically shaped fiberglass filter 66. By reference to FIGURE 8, it can be seen that the filter 66 may extend inwardly of the flange 63. The support ring 65 is sized to accommodate the exhaust tube 20 for ultimate connection to the air pump 19. The filter 66 is treated with an adhesize and hexachlorophene. The filter 66 is air pervious so that the air may pass therethrough but it sized to trap bacteria and any large sized impurities in the exhaust air.

The rear wall 27 is also integrally formed with a tubular sleeve 67 which extends into the plenum chamber 35 and is provided with a diametrically reduced flange 68 at its inner end. Fitted within the sleeve is an inlet tube 68' which engages the flange 68 at its inner end. A filter assembly is provided with a supporting ring 70 for retaining an inwardly extending conically shaped fiberglass filter 71. The filter 71 is substantially identical to the filter 66 and serves the same function. The filter 71 may also extend inwardly of the flange 68 in the manner as illustrated in FIGURE 5.

Figure 5:
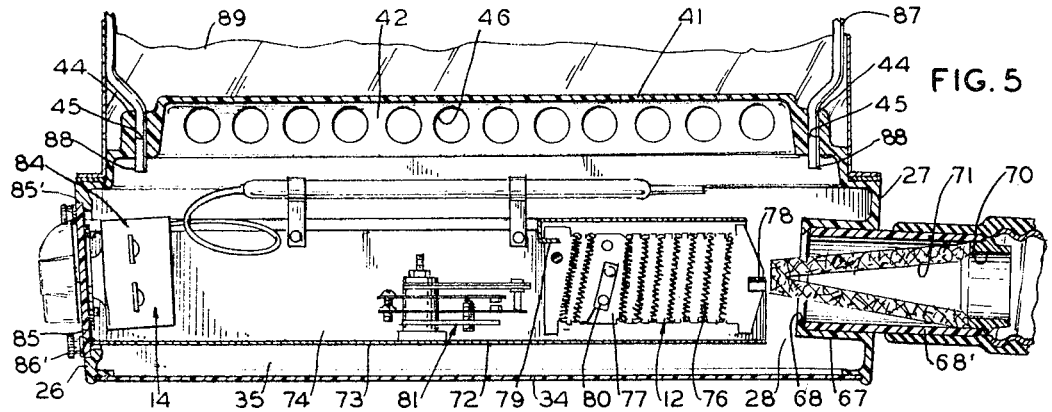
FIGURE 5 is a vertical fragmentary sectional view taken along line 5—5 of FIGURE 3.

The heating mechanism 12 and the control circuit 14 are disposed in the plenum chamber 35 in the manner as illustrated in FIGURES 5 and 6. The heating mechanism 12 comprises a metal housing 72 which extends transversely in the plenum chamber 35. The housing 72 includes a base wall 73 and an upstanding end wall 74. At its rearward end, reference being made to FIGURE 6, the housing 72 is provided with an open-ended rectangular compartment 75, for retaining a pair of spaced transversely disposed coil heaters 76. The heaters 76 are mounted on nonconductive support plates 77 which are held in the rectangular compartment 75 by means of inwardly struck brackets 78 at the rearward end of the compartment 75 and by downwardly struck flanges 79 at the forward end of the compartment 75. Also mounted on the support plates 77 are a pair of safety thermostats 80 which are electrically connected to the coil heaters 76.

Air from the atmosphere generator C is forced past the coil heaters 76 and into the plenum chamber 35. The thermostats 80 serve as "safety thermostats" and will deenergize the coil heaters 76 if there is no moving air in the chamber 35 and the entrapped air in the chamber 35 exceeds 150° F. Also mounted on the base wall 73 of the housing 72 is a bimetallic strip thermostat 81, which serves as an "overheat thermostat" and which is connected to the atmosphere generator C in a manner and for a purpose more fully hereinafter described in detail. Riveted or otherwise rigidly secured to the end wall 74 are a pair of transversely spaced brackets 82 for supporting a bulb temperature sensor 83 for detecting the temperature of the air entering the chamber 13. The bulb temperature sensor 83 is hydraulically connected to a slow make and break temperature regulating thermostat 84 which is, in turn, connected to the heater 76. The thermostat 84 is mounted on a face plate 85 which is, in turn, secured to the forward margins of the metal housing 72 and to the front wall of the base housing 25 in the manner as illustrated in FIGURE 6. A pilot light 86 is also mounted on the face plate 85. Thus, the thermostat 84 is designed to control the temperature of the air within a desired range which is to enter the chamber 13 and the sensor 83 will detect the temperature of the air entering the chamber 13. The electrical connections of the aforementioned components are more fully illustrated in FIGURE 24 and are more fully discussed in detail hereinafter.

It can be seen that the entire heating mechanism is mounted on the metal housing 72, which is inserted into the base housing 25 through an aperture 85' formed in the front wall 26. The face plate 85 is removably secured to the front wall 26 by thumb screws 86' so that the entire heating mechanism and control circuit may be removed as a unitary structure.

The air which has been preconditioned to a preselected temperature in the plenum chamber 35 is then forced into the chamber 13 through the air apertures 46 and circulated throughout the chamber 13. The exhaust air from the chamber 13 is then forced through the apertures 47 and into the exhaust chamber 32 where it is then forced into the incinerator D.

Provided for removable insertion into the four apertures 45 are a pair of longitudinally spaced arcuately shaped hoops 87 which have inwardly struck legs 88 at their lower ends, the legs 88 being sized for snug fitting in the apertures 45. The hoops 87 are formed of a lightweight metal such as aluminum with a fair amount of resiliency so that they can be bent slightly when the hooks 88 are inserted into the apertures 45. Disposed over and being supported by the hoops 87 is a removable and disposable sheath 89 or so-called "canopy" which forms the incubator chamber 13. The sheath 89 is preferably made of a flexible transparent plastic material such as polyethylene. The sheath 89 should be sufficiently rigid, however, to support the weight of small apparatus secured thereto and preferably has a thickness of about ten to twenty thousandths of an inch. The sheath 89 is semicircular in vertical cross section and has an outwardly flaring flange 90 along the periphery of its lower margins. The underside of the flange 90 and the portion of the sheath 89 adjacent to the flange 90 is coated with a suitable adhesive so that the flange 90 is adhesively secured to the portion of the top wall 29 on the exterior of the bead 36 and to the vertical wall 37 of the bead 36. The adhesively coated portions of the sheath are covered with a removable protective tape which may be removed before the sheath 89 is secured to the base housing 25. The adhesive which is used should be capable of providing a removable adherence so that the sheath 89 can be easily removed when it is to be replaced. The adhesive further provides an air-tight seal when the flange 90 and the lower margins of the sheath 89 are secured in the manner as described.

It is possible to provide a vinyl tape which is adhesively coated on each of its flat surfaces so that one of the flat surfaces is secured to the interior of the lower margins of the sheath 89 and to the underside of the flange 90. This type of structure will avoid the necessity of coating the inner surface of the sheath 89. It should also be recognized that an additional removable cover could be applied to the external exposed surface of the tape, if this latter structure is employed.

A pair of longitudinally spaced tabs 91 may be electrically welded, glued or otherwise secured to the interior surface of the sheath at each of their ends so that they may removably support a thermometer 92, in the manner as illustrated in FIGURE 4. The tabs 91 should be so located so that the thermometer 92 is easily visible from the exterior of the sheath 89.

A pair of vertically spaced straps 92' are also tacked or otherwise secured at their ends to the forwardly presented surface of the sheath 89 for supporting a conventional drinking water bottle 93 in the manner as illustrated in FIGURES 1 and 4. The bottle 93 is inverted and is provided with a diametrally reduced neck 94 for accommodating a rubber stopper or plug 94'. A tube 96 is inserted into an aperture formed in the stopper 94' and communicates with the water in the interior of the bottle 93. The tube 96 extends through a grommet 97 formed in the wall of the sheath 89 and into the chamber 13, in the manner as illustrated in FIGURE 1. The tube 96 is hollow and of a sufficiently small diameter so that a vacuum is created in the bottle 93 thereby preventing the water from pouring out through the tube 96. The tube is small enough and somewhat rigid so that it can be engaged in the mouth of a small animal disposed in the chamber 13. The tube bore is small enough so that the animal will be able to extract water from the bottle 93 when the animal licks the end of the tube 96.

On each of its transverse ends, the sheath 89 is provided with hand gloves 98 of the conventional type. The hand gloves 98 may be integrally formed with the sheath 89 or they may be secured thereto in any conventional manner. The hand gloves 98 may also be formed of polyethylene or any other suitable synthetic plastic or resin or rubber material. The gloves 98 are designed with arm portions of sufficient length that the operator may reach into the chamber 13 and lift the animal disposed therein or to perform any other necessary function.

The sheath 89 is provided on its forward surface with a transfer station 99, which is more fully illustrated in FIGURES 4 and 9. The transfer station 99 includes a pair of open ended flexible plastic sleeves 100, 101 which are sealed together along their opposed annular margins in a unitary structure. The sheath 89 is centrally apertured in the area of the sleeves 100, 101 and the sleeves are secured to the sheath 89 in any conventional manner along the annular margin of the aperture formed in the sheath 89. One of the sleeves 100 is located externally of the sheath 89 and the other of the sleeves 101 is located internally of the sheath, in the manner as illustrated in FIGURES 4 and 9. The open ends of the sleeves 100, 101 are closed with removable clamps 102 and form a transfer chamber 103 therebetween.

The clamps 102 are more fully illustrated in FIGURE 10 and are provided with a pair of spaced opposed handles 104 which will open engageable jaws 105 when the handles 104 are pressed toward each other. The jaws are sized to accommodate the open ends of the sleeves 100, 101 when the handles are squeezed toward each other. When the jaws 105 are permitted to return to their normal position, they will engage the open ends of the sleeves 100, 101 and form an air-tight seal in the manner as illustrated in FIGURE 9. The jaws 105 are integrally formed at their ends with a ring 106 which serves as a spring to normally bias the jaws 105 to the engaged position in the manner as illustrated in FIGURE 10.

It can be seen that the incubator B is an internally isolated system when connected to the atmosphere generator C and in effect, serves as an isolator. The air from the atmosphere generator C is blown into the plenum chamber 35 where it is forced past the coil heaters. The air from the atmosphere generator C is preconditioned in the atmosphere generator C to the proper humidity and to approximately the right temperature. It is oftentimes necessary to vary the temperature of the air for each individual incubator B and the coil heaters 76 serve this function. The temperature of the heaters 76 can be set by the thermostat 84, and the temperature of the air to be admitted to the chamber 13 is served by the sensor 83.

The air passes through the air apertures 46 and into the chamber 13 where it next passes through the apertures 47 and into the exhaust chamber 32. The air from the exhaust chamber 32 is next forced into the incinerator D. The pressure inside each of the chambers 13 can be regulated somewhat by the pressure relief valve 22.

It is possible to provide a modified form of sheath or canopy 107 which is more fully illustrated in FIGURES 11 and 12 and which is used with the base housing 25. The sheath 107 is similarly supported on the hoops 87 and in turn forms the incubator chamber 13. The sheath 107 is also made of a flexible transparent plastic material such as polyethylene and may also be sufficiently rigid to support the weight of small apparatus secured thereto. The sheath 107 is also provided with an adhesive or vinyl tape 108 for securement to the base housing in the manner as illustrated in FIGURE 12. The sheath 107 is similar in all other respects to the sheath 89 except that the sheath 107 is not provided with hand gloves or the double-walled sleeve.

On each of its transverse ends the sheath 107 is provided with central apertures 109 and secured to the sheath 107 along the margins of the apertures 109 are centrally apertured access sheets 110 which can be opened for access to the interior of the chamber 13. The sheets 110 may be pleated or provided with excess of material so that the material can be gathered and secured in the form of a knot by means of the clamps 102, in the manner as illustrated in FIGURE 11. When access to the chamber 13 is desired, the handles 104 are squeezed together and removed from the material so that the sheets may be opened. When the lamps 102 are secured to the sheets in the manner as illustrated in FIGURE 11, an air-tight seal is created.

It can be seen that when the modified form of canopy 107 is employed, the incubator B does not function as an isolator. In many cases, it is not necessary to atmospherically isolate the animal such as in the rearing stage. In this event, the canopy 107 is preferred inasmuch as it provides more convenient access to the chamber 13.

Atmosphere generator

The atmosphere generator is more fully illustrated in FIGURES 13 to 22 and is connected to the tubular sleeve 67 of each of the incubators B by means of a delivery tube 111. The atmosphere generator generally comprises an outer housing 112 which includes a front wall 113, a left side wall 114 and a rear wall 115. At their right transverse margins, the left side wall 114 and front wall 113 integrally merge into relatively short longitudinally opposed right end walls 116. The front wall 113, side wall 114 and rear wall 115 can be formed as an integral section and bent into a desired shape. A bottom wall 117 is welded or otherwise secured to the lower margins of the aforementioned walls to form a unitary structure.

Each of the right end walls 116 is integrally formed with inwardly extending flanges 118 which, in turn, integrally merge into longitudinally opposed flanges 119 in the manner as illustrated in FIGURES 14 and 15. The bottom wall 117 is integrally formed with an upstanding L-shaped bracket 120 and similarly fitted on the upper end of the flanges 118 is another bracket 121 which is spaced upwardly from the bracket 120. Retentively held in place by the brackets 120, 121 and the flanges 118 and 119 is a conventional dust filter 122. A louvered grill 123 is disposed over the filter 122 and is secured to the end walls 116 by means of screws 124. By means of this construction, the grill 123 can be easily removed for replacement of the filter 122.

An intermediate horizontally disposed wall 125 having an integrally formed upstanding flange 126 is disposed in and secured to the housing 112 below the upper margins thereof by means of sheet metal screws 127. Bolted or otherwise rigidly secured to the bottom wall 117 along the transverse margins and being spaced between the forward and rearward margins thereof are a pair of arcuately shaped retaining brackets 128. Secured to the underside of the intermediate wall 125 is a transversely extending L-shaped bracket 129 which is located in vertical alignment with the brackets 128. Similarly secured to the front wall 113 and the rear wall 115 in alignment with the brackets 128 are vertically extending L-shaped guides 130. Abutted against the guides 130 and against the brackets 128, 129 is a vertically disposed plate 131 and a foam rubber gasket 132 which are held in place by wing nuts and bolts 133 in the manner as illustated in FIGURES 14, 15 and 19. A pair of gaskets 134 are also disposed on the upper and lower peripheral margins of the plate 131 and complete an annular seal.

A top wall 135 preferably made of fiberglass and having an integrally formed downwardly struck flange 136 is secured to the upper margins of the housing 112 by means of screws 137. The top wall 135 is spaced upwardly from the intermediate wall 125 and forms a plenum chamber 138 therebetween. The vertical plate 131 divides the housing 112 into a blower chamber 139 and a mixing chamber 140.

The top wall 135 is cut away in the provision of an elongated slot 141 and disposed over the slot and being secured to the top wall 135 is a manifold 142. The manifold is provided with a pair of horizontally disposed flanges 143 and disposed therebeneath in sealingwise contact with the top wall 135 is a gasket 144. A pair of L-shaped clips 145 bear against the upper surface of the flanges 143 and are secured to the top wall 135 by means of bolts and wing nuts 146, thereby rigidly holding the manifold 142 in place. Secured to the manifold 142 are six aligned hose nipples 147 which are sized to accommodate the delivery tubes 111. Each of the nipples 147 is provided with conventional butterfly valves 148 having outwardly extending actuating handles 149. Thus, it is possible to selectively close any of the delivery tubes 111 leading to the incubators B by turning the actuating handle 149.

The top wall 135 is integrally provided with a pair of downwardly struck L-shaped brackets 150 which extend along the longitudinal margins of the slot 141. Disposed upon the horizontally struck portions of the L-shaped brackets 150 are a set of bacteria filters 151 for filtering out any bacteria prior to delivery to the incubators B. The intermediate wall 125 is further cut away in the region of the mixing chamber 140 thereby providing communication between the mixing chamber and the plenum chamber 138 in the manner as illustrated in FIGURE 16.

Disposed within the blower chamber 139 and being secured to the vertical plate 131 by means of screws 152 is a conventional squirrel cage blower 153 which forms part of the air supply mechanism 17 and which is designed to pump air at about a rate of 160 cubic feet per minute. A conventional alternating electric motor 154 is secured to the blower 153 for rotating the fan portion thereof. Interposed between the blower 153 and the vertical plate 131 is a rectangular sheet metal heater housing 155 which houses the heating mechanism 16. The heating mechanism 16 includes a pair of spaced coil heaters 156 having dielectric tabs 157 at their ends for insertion through apertures formed in the housing 155.

Integrally formed with or otherwise rigidly secured to one flat surface of the vertical plate 131 is a humidifier housing 158 which forms a humidity chamber 159 and which forms a part of the humidity control device 15. As a means of construction, the housing 158 is perferably integrally formed with the plate 131 so that this element can be fabricated as a unitary structure. The humidifier housing 158 is shaped so that it forms a water trough 160. The humidifier housing 158 is open at its upper end and is integrally provided with an outwardly flaring lip 161 for accommodating an outwardly extending flange 162 formed on a removable cover 163 in the manner as illustrated in FIGURES 15 and 17. When the removable cover 163 is disposed on the housing 158, it forms a substantially closed humidifier housing 158. The cover 163 is provided with an aperture 164 in its vertical wall and is also integrally provided with a pair of vertically spaced hinge leaves 165 adjacent to the aperture 164. Swingably mounted on the hinge leaves 165 by means of a hinge pin 166 is a valve door 167 which is adapted to swing in closurewise position over the aperture 164. Thus, when the valve door 167 is closed, that is when it is disposed over the aperture 164, all of the air from the blower 153 will be directed into the humidity chamber 158. When the valve door 167 is shifted to its open position, substantially all of the air from the blower 153 will pass directly into the mixing chamber 140. In any intermediate position between the fully open and closed positions, a portion of the air will be directed into the humidity chamber 159 and a portion of the air will be directed into the mixing chamber 140. The amount of the air directed into each of the chambers 140, 159 can be regulated by the position of the valve door 167.

The vertical plate 131 is apertured to provide communication between the blower 153 and the humidity chamber 159. A bracket 168 is provided with a pair of supporting flanges 168' which extend into the humidity chamber 159 for retaining a pair of finned cartridge heaters 169, which also forms part of the heating mechanism 16. The open coil heaters 156 are cycling heaters and are designed to provide fine temperature control. The finned cartridge heaters are designed to provide the major amount of heat which is added to the air from the blower 153. The top wall of the sheet metal housing 155 is cut away in the provision of an aperture 175 in the area of the open coil heaters 156. The top wall of the housing 155 is also provided with a downwardly extending flange 176 which is located in the pathway of the air from the blower 153 and causes the aperture 175 to open away from the direction of the air from the blower 153. Mounted on the top wall of the housing 155 and being disposed over the aperture 175 is a leaf type generator overheat thermostat 177. If the blower 153 should fail, then the air in the sheet metal housing 155 will become heated by the coil heaters 156 and when the temperature of the air exceeds 150° F., the thermostat 177 will deenergize both the heaters 156 and the heaters 169 in a manner more fully described in detail hereinafter.

The position of the valve door 167 is regulated by a humidity control knob 178 which is mounted on a control panel 179, the latter being secured to the front wall 113. The actuating mechanism which is operable by the humidity control knob 178 is more fully illustrated in FIGURE 20 and comprises a rod 180 extending through the panel 179 and which is rotated by the knob 178. The rod 180 is secured to a link 181 which rotates therewith and which in turn, shifts an L-shaped link 182 or so-called "bell crank" through a rigid connecting wire 183. The link 182 is pivotally mounted on an upstanding post 184 on the humidifier cover 163. The L-shaped link 182 is connected to the valve door 167 through a control rod 185. Thus, by turning the knob 178 through a desired arc, it is possible to open the valve door 167 to a desired position through the link system hereinabove described.

Secured to the flat face of the vertical plate 131 in the blower chamber 139 by means of screws 186 is a conventional shaded pole alternating current electric motor 187 having an integral speed or gear reducer for providing an output of approximately 5 revolutions per minute. The motor 187 has a drive shaft 188 which extends through the plate 131 and into the humidity chamber 159. Mounted on the end of the shaft 188 located in the humidity chamber 159 and being rotatable therewith is a circular media wheel 189 having a hub 190 for accommodating the shaft 188. The shaft 188 may be splined and the hub 190 may be provided with a groove, if desired to provide a relatively tight connection therebetween. The media wheel 189 is integrally provided with a plurality of circumferentially spaced outwardly extending fingers 191 for supporting a somewhat porous circular water collecting pad or so-called media 192. The pad 192 is preferably made of a material such as a spongelike material which is capable of temporarily entrapping water and is capable of releasing the water to a stream of air passed therethrough. Furthermore, the pad 192 is sized so that it snugly though nevertheless removably fits over the fingers 191. By means of this construction, the pad 192 can be periodically changed.

The water in the trough 160 is maintained at a certain water level so that a portion of the pad 192 will be submerged in the water. As the media wheel 189 rotates and carries therewith the pad 192, a portion of the pad 192 which has just been submerged in the water will be next exposed to the air from the blower 153. As the air passes through the pad 192, it will collect a portion of the water and hence increase the humidity content of the air. The air next passes through an aperture 193 formed in the wall of the humidifier housing 158 which is opposed to the vertical plate 131. The air will then pass into the mixing chamber 140. If the valve door 167 is partially opened then a portion of the air from the blower 153 will pass directly into the mixing chamber 140. This air will then mix in the mixing chamber 140 with the portion of the air which passed through the pad 192 in the humidity chamber 159 to form an air mixture of desired humidity. Furthermore, this air will have the desired temperature since it has been preheated by the open coil heaters 156 and the finned cartridge heaters 169.

An immersion heater 194 is disposed in the humidity chamber 159 below the water level in the trough 160 and is supported by a vertically extending tube 194'. The immersion heater 194 is operated by a switch 195 which is also located on the control panel 179. When the heater 194 is energized, the water in the trough 160 will be heated so that the air passing through the pad 192 will be humidified to an even greater extent.

The water in the trough 160 is maintained at a desired level by means of a level control device 196 which is more fully illustrated in FIGURES 16 and 17. Water is supplied to the trough 160 from a delivery tube 197 which is ultimately connected to a five gallon water bottle 198, the latter being supported on a shelf 199, which is, in turn rigidly secured to the back plate 9. The bottle 198 may be maintained under a slight pressure in order to urge the water into a tube 200 and thereby insure a continual supply of water to the trough 160. Furthermore, the water should be distilled and may be treated to remove any microorganisms which still may be present. The tube 200 is connected to a pipe fitting 201 which is located on the control panel 179 and being secured to the inner end of the pipe fitting 201 is the tube 197. The other end of the tube 197 is connected to a fitting 202 which communicates with the trough 160. In this manner, a communication between the water bottle 198 and the trough 160 is maintained.

The level control device 196 generally includes a pivot block 203 which is secured to the interior wall of the humidifier housing 158. The pivot block 203 is drilled to form an upwardly opening orifice 204 which communicates with the fitting 202 and the tube 197. The area around the orifice 204 is reduced in the form of a cavity 205 in the manner as illustrated in FIGURE 17. Pivotally mounted on the pivot block 203 is a float 206 which has an upwardly extending bracket 207 and formed with the bracket 207 is a horizontally disposed arm 208. Mounted on the underside of the arm 208 is a rubber plug 209 which is adapted to seat on the orifice 204. When the level of water in the trough 160 is too low, the float 206 will pivot in a clockwise direction about the block 203, reference being made to FIGURE 17. This will cause the plug 209 to shift upwardly from the orifice 204 thereby permitting water to enter into the trough through the orifice 204. As the water level rises, the float 206 will pivot in a counter-clockwise direction about the pivot block 203. When the water in the trough 160 reaches the desired level, the float 206 will pivot to a position where the plug 209 is disposed over and seated upon the orifice 204, thereby stopping the flow of water into the trough 160.

The atmosphere generator C is designed to supply a sufficient amount of air for six incubators. If one or more of the incubators B is not functioning as an isolator, they may be operatively disconnected from the atmosphere generator C by closing of the butterfly valve 148 in the tube 111 leading to those incubators. This may cause an excess presure build-up in the plenum chamber 138. The generator C is, therefore, provided with a pressure relief valve 210 which is mounted on the underside of the intermediate wall 125 and provides operative communication between the blower chamber 139 and the plenum chamber 138.

The pressure relief valve 210, which is more fully illustrated in FIGURES 15 and 18 is adapted to sit over an aperture 211 formed in the intermediate wall 125. The valve 210 is formed by a flat plate 211' having a pair of downwardly struck flanges 212 which terminate in enlarged ears 213. The ears 213 are pivotally mounted on a pair of flanges 214 formed on the underside of the intermediate wall 125 by means of a pivot pin 215. One of the ears 213 integrally merges into a flange 216 which extends downwardly and diagonally away from the aperture 211. The flange 216 is provided with a plurality of sapced apertures 217 which also extend downwardly and diagonally away from the aperture 211. Also mounted on the underside of the intermediate wall 125 in alignment with the flange 216 is a downwardly extending flange 218 which is provided with a plurality of vertically spaced apertures 219. Extending between a pair of aligned apertures 217, 219 is a weak spring 220 which is maintained under slight tension, and thereby urges the relief valve 210 to a closed position. Rigidly secured to the underside of the plate 211' by means of screws 221 is a downwardly extending bracket 222 which terminates at its lower end in a circular boss 223'. Fitted within and being retained by the boss 223 is a horizontally disposed rod 224 which is externally threaded at its free end. Threaded on the free end of the rod 224 is a pair of nuts 225 which can be locked in a desired position when they are threaded to abut against each other. The nuts 225 serve as weights and tend to urge the valve 210 to the open position.

The spring 220 can be placed in any of the aligned apertures 216, 219 for creating the desired force moment to open the relief valve 210. When the spring 220 is placed in the lowermost set of apertures 216, 219 a greater degree of tension is placed on the spring 220. Moreover, a greater force moment is created and this creates a greater force urging the relief valve 210 to the closed position. This force is offset by the weight of the nuts 225 tending to urge the relief valve 210 to the open position. The degree of force urging the valve 210 to the open position can be decreased by turning the nuts to the outer end of the rod 224. Generally, the two offsetting forces are estabished to hold the pressure relief valve 210 in the closed position as illustrated in FIGURE 18. The force holding the valve 210 in the closed position, however, is slight so that a pressure build-up in the plenum chamber 138 will open the valve 210 thereby permitting a recycling of the air into the blower chamber 139.

In the operation of the atmosphere generator C, air is drawn into the blower chamber 139 through the louvered grill 123 and across the filter 122. The air is drawn into the blower 153 and forced across the open coil heaters 156 and across the finned cartridge heaters 169. If the valve door 167 is opened substantially all of the heated air would be directed into the mixing chamber 140. If the valve door 167 is closed, all of the air would be directed into the humidity chamber 159 and across the pad 192. Since the media wheel 189 rotates the pad 192, the air would be forced through the pad 192 where it will absorb some of the water therein and be forced through the aperture 193 into the mixing chamber 140. If the valve door 167 were partially opened, some of the air would be directed into the mixing chamber 140 directly and some of the air would be forced through the humidity chamber 159. The humid and dry air would then mix in the mixing chamber 140. The position of the valve door 167 and hence the amount of humidity in the mixed air is controlled by the humidity control knob 178.

The air is next passed upwardly into the plenum chamber 138 where it will pass through the filters 151 and outwardly through the nipples 147. The temperature of the air passing into the plenum chamber 138 is sensed by a temperature sensing bulb 226 which is retained in an upwardly struck supporting flange 227 formed in the upper surface of the intermediate wall 125. The bulb 226 is located in the aperture providing communication between the mixing chamber 140 and the plenum chamber 138 and is, therefore, in the direct pathway of the air moving into the plenum chamber 138.

It is possible to provide a modified form of pressure relief valve 210', which is more fully illustrated in FIGURE 21. The pressure relief valve 210' is substantially similar to the pressure relief valve 210 and is disposed over an aperture 211" formed in the rear wall 115. The pressure relief valve 210' generally comprises a swingable plate 212' which is hinged at its upper end and adapted to swing outwardly on an overpressure condition in the plenum chamber 138. The plate 212' and the rear wall 115 are each provided with matching inwardly extending flanges 213', 214', respectively and each having a plurality of spaced apertures 215', 216' respectively. A light spring 217' is fitted in any of the apertures 215', 216' and biases the plate 212' to the closed position over the aperture 211".

The pressure relief valve 210' is desirable when it is preferred to exhaust the extra unused quantity of conditioned air from the generator C to the atmosphere. By means of this type of construction, the air is exhausted to the atmosphere rather than being recycled into the blower chamber 139.

Incinerator

The air from each of the incubators B is discharged through the exhaust tubes 20 by the pump 19 and transmitted to the incinerator D. The incinerator D is more fully illustrated in FIGURE 23 and generally comprises an outer housing 228 which has a horizontally disposed intermediate plate 229 dividing the housing into a blower chamber 230 and an upper air chamber 231. The blower chamber 230 is provided with six apertures 232 for receiving intake tubes 232' from the air pump 19. A conventional blower 233 mounted in the blower chamber 230 forces the intake air from the incubators B into the air chamber 231, through an aperture 234 formed in the intermediate plate 229.

A stack 235 which is diametrically smaller than the housing 228 is secured to the intermediate plate 229 and extends upwardly through the air chamber 231. The stack 235 terminates at its upper end in the form of a flu 235 and extends outwardly of the housing 228. Also mounted on the intermediate plate 229 and extending upwardly therefrom and surrounding the stack 235 is a circular sleeve 237 which is open at its upper end and terminates below the upper end of the housing 228. The sleeve 237 thereby forms an intake chamber 238 in the air chamber 231. The stack 235 is also provided with a horizontal plate 238' which forms a lower burner chamber 239. Mounted in the burner chamber 239 is a gas jet burner 240, which is connected to a suitable source of fuel (not shown) by means of a fuel line 241.

The lower part of the stack 235 is provided with apertures 242 in the area of the burner chamber 239. The air from each of the individual incubators B is forced into the blower chamber 230 through the apertures 232 where the air is then forced into the air chamber 231 through the blower 233. The air in the air chamber 231 will be forced upwardly therein and will be forced into the intake chamber 238. The air in the intake chamber 238 will be in contact with the stack where it will be preheated. This preheated air then enters the burner chamber 239 where it is mixed with a gaseous fuel and ignited at the burner. Any microorganisms in the air will be destroyed in the heated air which is then dispelled through the stack 235 and the flu 236.

The incinerator D is provided with the gnotobiotic system A to form a complete integrated isolation system. However, it should be recognized that the gnotobiotic system A is operable without the incinerator D. In many laboratories, incinerators and other bacteria destruction devices are available and where the incinerator D is not needed. In this event, the exhaust lines from each of the incubators B could be connected to the incinerator or other bacteria destruction devices thus provided.

It should also be recognized that the destruction of the bacteria and other microorganisms could be accomplished by other devices such as by high frequency sound. It has also been found that electrostatic fields are useful in the destruction of microorganisms. Any of these other methods of destruction could be incorporated in a suitable device and provided with the gnotobiotic system A in place of the incinerator D.

Control circuit

The control circuit 18 forming part of the gnotobiotic system A is schematically illustrated in FIGURE 24 and some of the components in the control circuit 18 are mounted in the control panel 179 which is illustrated in FIGURE 22. Six plug receptacles 243 are mounted on the control panel 179 and are adapted to receive plugs 244 of each of the incubators B. One terminal of each of the receptacles 243 is connected to a pair of fuses 243. As indicated above, the control circuit 14 of each of the incubators B is disconnectable from the major control circuit 18, and, therefore, each of the incubators B is provided with an electrical cord 245 which terminates in the plug 244.

The incubator control circuit 14 includes the safety thermostats 80, the bimetallic strip thermostat 81 and the temperature regulating thermostat 84. The plug 244 is a four terminal element and two of the terminals are connected directly to the overheat thermostat 81 and to the temperature regulating thermostat 84, respectively. The thermostats 81, 84 are, in turn, each connected to one of the safety thermostats 80 which are, in turn, connected to the coil heaters 76. The heaters 76 also have a common series connection. Connected across the thermostats 81 and 84 is an indicator light 246 which is, in turn, connected to the third terminal of the plug 244. The fourth terminal of the plug 244 is grounded and provides a chasis ground.

The safety thermostats 80 are designed to open on temperature rise at a temperature of 150° F. to deenergize the heaters 76. If no air is moving into the incubators B from the generator C, the heaters 76 will rapidly overheat and will be deenergized at 150° F. by the safety thermostats 80. The thermostat 84 is also designed to open on temperature rise and has a range of from 80 to 180° F. This thermostat provides the proper temperature of the air to enter the incubator chamber 13 and is capable of providing a 10° F. temperature variation of the air from the generator C. The overheat thermostat 81 is designed to close on temperature rise and will close at a temperature of 105° F. This thermostat will close in the event that the air from the generator C is too hot for the conditions of the particular incubator B.

The indicator light 246 is designed to show how much temperature cycling is occurring in the control mechanism of the incubator B. The light 246 will be energized when the heaters 76 are energized. If the light 246 is on for too long a time then this is an indication that the air from the generator is not sufficiently warm. On the other hand, if the light 246 is off for a long time then this is an indication that the air from the generator is too warm. In the event that the air from the generator is not sufficiently warm, it is possible to cut the air flow slightly by partially closing the butterfly valve 148 leading to the particular incubator B. The indicator light 246 also provides a desirable mechanism to attain proper temperature in the incubator compartment 13. The temperature regulating thermostat 84 is turned up until the indicator light 246 is energized. This will heat the air entering the incubator compartment 13 for a slight temperature rise then causing the heaters 76 to become deenergized thereby deenergizing the light 246. The temperature of the compartment 13 can then be observed by the thermometer 92. This operation can be continued until the proper temperature in the compartment 13 is attained.

The control circuit 18 is connected to a suitable source of 110 volt alternating electrical current by a three cord conductor 247 having a positive conductor 248, a neutral conductor 249 and a ground conductor 250, the latter serving as a chasis ground. The plug receptacles 243 are four terminal elements and one of the terminals on each receptacle 243 is connected to the ground conductor 250, one of the terminals is connected to the neutral conductor 249 and one of the terminals is connected to the positive conductor 248.

The atmosphere generator C is also provided with a tilt mechanism 251 which is more fully illustrated in FIGURE 24. The tilt mechanism 251 is provided to insure that the atmosphere generator C is always positioned in a substantially upright position. Since the atmosphere generator contains a quantity of water in the trough 160, the water may short some of the electrical components if the generator were tipped beyond a certain angle. The tilt mechanism 251 is therefore provided to deenergize the electrical circuitry when the generator is tilted beyond a certain preselected angle with respect to the horizontal.

The tile mechanism generally comprises a ball or weight 252 which is suspended on an electrically conductive spring 253, the spring 253 in turn being connected to the positive conductor 248. The ball 252 is disposed in free floating suspended position in an electrically conductive ring 254 which is also electrically connected to a tilt indicator light 255, the latter being mounted on the control panel 179. The ring 254 is also electrically connected to a tilt relay 256 which operates two sets of contacts 257, 258. A tilt reset switch 259 is electrically connected to the open contact of the contact set 258 and to the tilt indicator light 255. The normally closed contact of the contact set 257 is electrically connected through a main power switch 260 to the positive conductor 248. The tilt reset switch 295 is also mounted on the control panel 179.

If the atmosphere generator C should be tilted beyond a certain angle with respect to the horizontal the spring 253 will contact the ring 254 since the weight 252 will always assume a true vertical position. This will complete a circuit to the tilt relay 256 opening the contact sets 257, 258. This will also complete a circuit to the tilt indicator light 255 energizing the same and will deenergize the remainder of the components in the control circuit 18. When the tilt reset switch 259 is opened, this will deenergize the tilt relay 256 permitting the contacts 257, 258 to assume the normal position as illustrated in FIGURE 23.

The normally closed contact of the contact set 258 is connected through a fuse 261 to the switch 195 which operates the immersion heater 194. This contact is also connected to a humidifier motor switch 262 which operates the humidifier motor 187. This contact is also connected to the main power switch 260 which also operates the blower 153. The switches 195, 260 and 262 are all mounted on the control panel 179. All of the fuses including the fuse 261 are mounted on the control panel 179 for easy access. Moreover, a number of fuses are provided in the control circuit 18 so that the burning out of one fuse will not necessarily deenergize all of the components forming part of the gnotobiotic system A.

The normally closed contact of the contact set 257 is connected through a fuse 263 to a contact set 264 which is operable by an overheat relay 265, the latter being connected to one terminal of each of the plug receptacles 243. The normally closed contact of the contact set 264 is connected to one terminal of a temperature controlling rheostat 266. The rheostat 266 has a movable arm 267 which is connected to an indicator light 268 which is, in turn, mounted on the control panel 179. The movable arm 267 is also electrically connected to the finned cartridge heaters 169, the heaters 169 being connected in parallel. The movable arm is operable by a control dial 269 which is mounted on the control panel 179. The normally open contact of the contact set 264 is connected to an overheat light 270 which is similarly mounted on the control panel 179.

The rheostat 266 is designed to set the proper temperature of the finned cartridge heaters 169 which provide the larger amount of heat in the heating mechanism 16. When the heaters 169 are energized, the light 268 will be energized. However, if the heat produced by the heaters 169 combined with the heaters 156 should cause the temperature of the air to exceed 105° F., the overheat relay 265 will become energized thereby breaking the circuit to the rheostat 266 and the heaters 169. Furthermore, a circuit will be completed to an incubator overheat light 270 which is connected to the normally open contact of the contact set 264 causing the same to become energized. The overheat light 270 is similarly mounted on the control panel 179.

The other common terminal of the finned cartridge heaters 169 is connected to one terminal of the open coil heaters 156. The opposite terminal of the coil heaters 156 is connected in common to an indicator light 270 which is mounted on the control panel 179 and to one terminal of a temperature setting thermostat 271 which is also mounted on the control panel 179. The opposite terminal of the temperature setting thermostat 271 is connected through a fuse 272 to the normally closed contact of the contact set 257. A temperature control light 272' is also connected to the thermostat 271.

The combination of the finned cartridge heaters 169 and the open coil heaters 156 coupled with the rheostat 266 and the temperature setting thermostat 271 provides a unique system for attaining accurate temperature control with a minimum of temperature cycling. The finned cartridge heaters 169 provide the greater amount of heat and are capable of holding the heat generated therein for a longer period of time after they are deenergized due to the fins. The open coil heaters 156 on the other hand provide fine temperature adjustment. They are more sensitive to energization and will heat up and cool off more rapidly when energized and deenergized respectively. The temperature setting rheostat is normally set at approximately the desired temperature or even slightly below the desired temperature. The temperature setting thermostat 271 is then set to provide the slight additional amount of heat necessary to bring the air to the desired temperature. Actually, the open coil heaters 156 will serve as cycling heaters since they will cycle on and off due to slight temperature variations and thereby maintain the temperature of the heated air rather constant. The indicator lights 268 and 270 will advise when the cartridge heaters 169 and the open coil heaters 156, respectively, are in the energized state.

The thermostat 177 is located in close proximity to the open coil heaters 156 as illustrated in FIGURE 17 and will sense the temperature of the air passing through the coil heaters 156. If the blower 153 should fail, the air surrounding the heaters 156 would become stagnated and rapidly heat up. This condition would be sensed by the thermostat 177 and deenergize the heaters 156 and 169. An overheat indicator light 273 is connected to one terminal of the overheat thermostat 177 and will become energized when the overheat thermostat 177 is energized. The overheat indicator light 273 is similarly mounted on the control panel 179. A convenience outlet 274 may be connected to the electrical circuitry and mounted on the control panel 179, if desired.

Operation

In use, the three conductor cord 245 is connected to a suitable alternating current 110 volt source. The water bottle 198 is filled with a distilled water which may be further purified. The butterfly valves 148 and the valves 21 at the air pump 19 are opened. The pressure relief valve 22 is closed if a negative pressure is used in the system and is opened if a positive pressure is desired in the system. The gas jet burner is connected to a suitable source of gaseous fuel and ignited. Thereafter, the small animals are placed in the incubator chambers 13 of each of the incubators B which are to be used.

If the incubators B are to be used as an insolator then the first form of canopy 89 described herein is to be employed, and the incinerator D is also employed. If the incubators B are not to function as isolators then the modified form of canopy 107 may be employed. In this latter event, it is not necessary to employ the incinerator D.

An animal is then placed on the screen floor 58 and the canopy 89 is secured to the base housing 25. The inwardly struck legs 88 of the hoops 87 are placed in the apertures 45 for supporting the canopy 89. The protective tape is removed from the lower margins of the sheath 89 and from the flange 90 so that these elements may be adhesively secured to the portion of the top wall 29 exterior of the bead 36. The adhesive securement of the sheath 89 along its entire peripheral margin to the base housing 25 provides an air-tight seal therebetween. After the sheath 89 is thus secured, there is no further reason for removal of the canopy since it is generally not necessary to remove the animal from the incubator chamber 13. If for some reason, it is necessary to remove the animal then the sheath 89 can be disposed of and replaced with a new sheath. The animal may also be removed on occasion through the transfer station 99.

The animal can be attended to through the hand gloves 98. The gloves 98 are designed with arm portions of sufficient length that the operator may reach into the chamber 13 and lift the animal disposed therein or to perform any other necessary function. Furthermore, food and any other necessary implement or apparatus may be placed into the chamber through the transfer station 99. The outer sleeve 100 is first opened by removal of the clamp 102 and the food or other implement may be placed in the transfer chamber 103. Furthermore, a disinfectant may be sprayed into the transfer chamber 103. Thereafter, the sleeve 100 is closed by replacement of the clamp 102. By use of the hand gloves 98, the operator may remove the clamp 102 from the inner sleeve 101 and withdraw the food or implement from the transfer chamber 103. The inner sleeve 101 is then closed by replacement of the clamp 102. By means of this construction, the transfer chamber in effect isolates the incubator chamber 13 and the chamber 13 is never directly exposed to the atmosphere. When it is desired to remove the implement or food remnants from the chamber 13, the reverse of the above-outlined procedure is performed. In this case, the sleeve 101 is first opened and the implement placed in the transfer chamber 103. The inner sleeve 101 is next closed and the interior is again sprayed with a disinfectant and the object is then removed from the outer sleeve 100.

The excreta from the animal will fall through the screen floor 58 onto the top wall 29. The operator can remove the excreta from the chamber 13 without exposing the chamber 13 to the atmosphere by use of the hand gloves 98. The animal may be lifted from one of the screen sections and placed on the other of the screen sections. The first section can then be lifted so that the excreta can be scooped toward the valve plug 50. A wash bottle may be inserted into the chamber 13 through the transfer chamber 103 and that portion of the top wall 29 may be washed. The operator may next insert his hand through the access aperture 61 and raise the valve plug 50 until the apertures 55 are flush with the top wall 29. The excreta is next flushed into the bag 56. Thereafter, the animal may be placed on the opposite screen section and the first section raised so that the top wall 29 can be cleaned in the same manner. The valve plug 50 is next lowered and the bag 56 is unwound so that the new excreta may be permitted to fall into the lower section thereof. The bag 56 is next tied, wound or clamped so that the upper part thereof can receive the excreta on the next cleaning. After the bag 56 is filled, it can be disposed of by removal through the access aperture 61.

The proper temperature and humidity conditions of the air for the incubator chambers 13 is next set on the atmosphere generator C. As indicated above, the temperature desired in the incubators B may be slightly different in each of the individual incubators in the system A. Accordingly, the atmosphere generator C is set so that the air produced therein will have the temperature equivalent to the lowest temperature desired in any of the incubators B. The proper temperature may be set by turning the dial 269 which actuates the rheostat 266. Thereafter, fine temperature control may be achieved by regulating the adjustment of the thermostat 271. These thermostats will permit the heaters 169 and 156 to operate within the desired temperature range in the manner as previously described.

Thereafter, the proper humidity is established by actuation of the control knob 178. The turning of the control knob will open the valve door 167 to the desired position to regulate the amount of heated air that will pass into the humidity chamber 159. The air from the humidity chamber 159 will then mix with the dry heated air in the mixing chamber 140 to create a mixed air of desired temperature and humidity. To create an even higher humidity the immersion heater 194 in the trough 160 is energized. The level control device 196 will maintain the proper water level in the trough 160 in the manner as previously described. The air from the mixing chamber 140 will next pass into the plenum chamber 138 where it will pass through the filters 151 and into the manifold 142. The butterfly valves 148 to the incubators B in use will be in the open position permitting the air from the atmospheree generator C to be transferred to the incubators B through the delivery tubes 111.

If one or more of the butterfly valves 148 is closed then a back pressure is created in the plenum chamber 138 causing the pressure relief valve 210 to open. This valve wil remain in the open position until the back pressure in the plenum chamber 138 is reduced until it is substantially equivalent to the pressure in the blower chamber 139 which is approximately atmospheric pressure. When the valve 210 is opened, the air in the plenum chamber 138 will be recyclecd back into the blower chamber 139. This recycled air will then be mixed with the incoming air in the blower chamber 139 for further processing.

The air which is transferred to the incubators B will enter the plenum chamber 35. The air will be forced past the coil heaters 76 where it may be heated slightly if desired to achieve the temperature desired in that particular incubator B. The temperature regulating thermostat 84 is adjusted to provide the proper temperature in the manner as previously described. The temperature sensor 83 will periodically actuate the thermostat 84 which will, in turn, periodically energize the coil heaters 76 in order to maintain the proper temperature of the air entering the incubator compartment 13. The air will enter the compartment 13 through the apertures 46 and will exit through the apertures 47 where it is ultimately delivered to the incinerator D in the manner as previously described. By means of this construction, no foreign matter can enter the plenum chamber 35 or the exhaust chamber 32.

The thermostat 81 is designed to actuate the overheat relay 265 which will deenergize the heaters 169 if the air entering the incubator B from the generator C is too warm. The thermostats 80 will deenergize the heaters 76 in the incubator B if the incubator B receives no air from the generator C. This will prevent the heaters 76 from becoming overheated and permit hot air to enter into the incubator chamber 13. Furthermore, if the blower 153 should fail, the air surrounding the heaters 156 would become stagnated and rapidly heat up. This condition would be sensed by the thermostat 177 and deenergize the heaters 156 and 169. The various overheat lights previously described will be energized on the overheat condition advising the operator of the malfunction. Furthermore, the various heater indicator lights will be energized when the heaters with which they are associated are energized. These lights will advise the operator if the gnotobiotic system A is operating in a predescribed form.

It can be seen that the control circuits 14 and 18 are constructed with suitable safety mechanism to advise of any malfunction of either the incubators B or the atmosphere generator C. These safeguards will prevent any possible injury to the animals in the chambers 13 due to a malfunction of any part of the apparatus or through a mishandling by the operator.

MODIFIED FORM OF GNOTOBIOTIC SYSTEM

It is possible to provide a modified form of gnotobiotic system A' which is more fully illustrated in the perspective view of FIGURE 25. The gnotobiotic system A' is useful when it is desired to provide an incubation function and where the system does not have to serve as an isolator. This type of system is generally preferred when the animal is being reared and is not subjected to any microorganism testing.

The gnotobiotic system generally comprises an incubator B' which is substantially identical to the incubator B. However, the incubator B' is normally used with the canopy 107 rather than the canopy 89. The incubator B' includes a base housing 275 having tubular sleeves 276, 277 leading to the plenum chamber and exhaust chamber respectively, in the base housing 275. The tubular sleeves 276, 277 may also be provided with suitable filters, if desired. Secured to the tubular sleeve 276 communicating with the plenum chamber of the base housing 275 is a conventional blower 278 which is substantially similar to the blower 153. The blower 278 is provided with a filter 279 on the intake part thereof. Furthermore, a butterfly valve 280 similar to the butterfly valve 148 is interposed between the tubular sleeve 276 and the blower 278. The butterfly valve 280 is provided with an actuating handle 281 for actuation thereof. The valve 280 provides a means for regulating the quantity of air entering the plenum chamber of the base housing 275. The base housing 275 is similarly provided with all of the heating mechanisms and control system which is present in the incubator B.

The gnotobiotic system A' is useful when it is only necessary to provide room air for the incubator chamber. Furthermore, this system is desirable when there is no need to dispose of the exhaust air from the incubator chamber.

It should be understood that changes and modifications in the form, construction, arrangement and combination of parts presently described may be made and substituted for those herein shown without departing from the nature and principle of my invention.

Having thus described my invention, what I desire to claim and secure by letters patent is:

1. A control system for gnotobiotic systems and the like, wherein said gnotobiotic system includes an air generator with first temperature control means for conditioning the air and at least one incubator chamber with second temperature control means associated with each said incubator chambers; said control system comprising a first thermostat for regulating the temperature of the first temperature control means, a second thermostat for regulating the temperature of said first temperature control means within a preselected range, a third thermostat for regulating the temperature of said second temperature control means, and safety interlock means for deenergizing each of said temperature control means when the air reaches a preselected temperature.

2. The control system of claim 1 further characterized in that a tilt mechanism is provided for deenergizing said air generator if said generator is tilted beyond a preselected angle with respect to the horizontal.

3. An atmosphere generator for the conditioning of air to be used in incubatory processes and the like, said atmosphere generator comprising an outer housing, means forming a first chamber in said housing, air transfer means in said first chamber, means forming a second chamber in said housing, temperature control means in said second chamber, means forming a third chamber in said housing, humidity control means in said second chamber, means providing communication between said air transfer means and said second chamber, and means for withdrawing the air from said housing.

4. A gnotobiotic system for the housing of animals under controlled conditions, said system comprising an atmosphere generator for producing air of controlled quality, a chamber sized to accommodate an animal and being isolated from the surrounding atmosphere, means for delivering the air of controlled quality to said chamber, a heating mechanism operatively associated with said chamber to further control the quality of the air prior to entry into said chamber, said heating mechanism including the combination of a first heater having long heat retention characteristics and a second heater having rapid heat dissipation characteristics, and control means operatively associated with said chamber and being operatively connected to said heating mechanism to regulate the temperature of the air admitted into said chamber.

5. A gnotobiotic system for the housing of animals under controlled conditions, said system comprising an atmosphere generator for producing air of controlled quality, a chamber sized to accommodate an animal and being isolated from the surrounding atmosphere, means for delivering the air of controlled quality to said chamber, a heating mechanism operatively associated with said chamber to further heat the air prior to entry into said chamber, temperature control means operatively associated with said chamber and operatively connected to said heating mechanism for regulating the temperature of the air admitted into said chamber, said heating mechanism comprising the combination of a first heater having long heat retention characteristics, a second heater having rapid heat dissipation characteristics, said control means comprising a temperature sensing thermostat, and a variable input mechanism for regulating power to said temperature control means.

6. An incubator for the housing of small animals and the like, said incubator comprising base means, a canopy operatively disposed over said base means forming an internal chamber, said base means having a wall, a supporting element disposed above said wall, said supporting element permitting excreta of an animal to be deposited on said wall, withdrawal means associated with said base means for withdrawing the excreta deposited on said wall, means associated with said base means forming a plenum chamber, means also associated with said base means forming an exhaust chamber, means providing fluid communication between said phenum chamber and internal chamber and between said exhaust chamber and internal chamber, and conditioning means in said plenum chamber for conditioning air prior to entry into said internal chamber.

7. The incubator of claim 6 further characterized in that said incubator is provided with a control circuit for controlling the conditioning of the air for admission to said internal chamber.

8. An incubatory system for the housing of animals under controlled conditions, said system comprising an atmosphere generator for producing air of controlled quality, a plurality of individual chambers which are isolated with respect to each other, each of said chambers being sized to accommodate an animal and each being isolated from the surrounding atmosphere, an air inlet associated with each of said chambers, and individual flexible connecting means operatively extending between said atmosphere generator and the air inlet of each of said chambers so that the individual connecting means between said generator any any one chamber is not connected to any other chamber for delivering the air of controlled quality from said generator to each of said chambers through the individual flexible connecting means between each of the chambers and said generator.

9. The incubatory system of claim 8 further characterized in that said atmosphere generator serves as a central source for controlled air for all of said individually isolated chambers.

10. The incubatory system of claim 8 further characterized in that valve means is operatively associated with said atmosphere generator for individually controlling the amount of air delivered to each of said isolated chambers.

11. The incubatory system of claim 8 further characterized in that temperature conditioning means is operatively associated with each of said chambers to further control the quality of the air prior to entry into said chambers.

12. The incubatory system of claim 11 further characterized in that control means is operatively associated with each of said chambers and is operatively connected to the temperature conditioning means of said chamber for regulating the temperature of the air admitted into said chambers.

13. The incubatory system of claim 11 further characterized in that temperature control means is operatively associated with said atmosphere generator for changing the air of controlled quality to a preselected temperature.

14. The incubatory system of claim 8 further characterized in that temperature conditioning means is operatively associated with said chambers to further control the quality of air prior to entry into said chamber, control means operatively connected to said temperature conditioning means for regulating the temperature of the air admitted into said chamber, said control means comprising a temperature setting thermostat and a variable input power mechanism for regulating power to said temperature control means.

15. The incubatory system of claim 8 further characterized in that temperature conditioning means is operatively associated with each of said chambers to further control the quality of air prior to entry into said chambers, temperature conditioning means operatively associated with said atmosphere generator for rendering the air of controlled quality to a preselected temperature, sensing means operatively associated with each of said chambers for detecting undesirable temperature conditions therein, and means operatively connecting said sensing means and said atmosphere generator temperature conditioning means for regulating said last named means responsive to a temperature change in any of said chambers.

16. The incubatory system of claim 8 further characterized in that said system includes an air incinerator, and means operatively connecting the exhaust side of each of said chambers to said air incinerator for disposing of microorganisms in the exhaust air from each said chamber.

17. A transfer station for animal houses and the like which have a canopy forming an internal chamber, said transfer station comprising an aperture formed in said canopy, a first flexible sleeve permanently fused to said canopy around said aperture and opening into the interior of said internal chamber and being optionally closable, a second flexible sleeve opposed to said first sleeve and being permanently fused to said canopy around said aperture and opening exteriorly of said internal chamber and being optionally closable, and a transfer chamber formed between each of said sleeves.

18. The transfer station of claim 17 further characterized in that said sleeves and said canopy are formed of substantially similar material.

19. An incubator for the housing of small animals and the like, said incubator comprising base means, a canopy operatively disposed over said base means forming an internal chamber substantially isolated from the atmosphere external to said canopy, said base means having a wall, a screen-like supporting element disposed above said wall, said screen-like member being divided into two sections, means pivotally connecting said two sections so that one section can be raised with respect to the other and with respect to said wall to form a partitioned area with respect to said canopy for retention of an animal in the chamber during the removal of the excreta from said chamber, said supporting element permitting excreta of an animal to be deposited on said wall, entrance means on the canopy to enable an operator to attain operative entry into said internal chamber to manipulate said sections and shift the excreta on said wall without substantially contaminating the internal chamber with the atmosphere external to said canopy, and withdrawnal means associated with said base means for withdrawing the excreta deposited on said wall.

20. The incubator of claim 19 wherein said entrance means comprises at least one aperture formed in said canopy, and a flexible open-ended hand glove permanently fused to said canopy around said aperture in a fluid-tight condition, said glove extending into said chamber and being sized to receive the hand of an operator.

21. The closure of claim 19 wherein the canopy is disposable.

22. An incubator for the housing of small animals and the like, said incubator comprising base means, a canopy operatively disposed over said base means forming an internal chamber, said base means having a wall, a supporting element disposed above said wall, said supporting element permitting excreta of an animal to be deposited on said wall, an aperture formed in said wall, an annular flange surrounding said aperture and extending downwardly from said wall, a plug being shiftable in said aperture to an open and a closed position, and aperture means formed in said plug and being shifted in alignment with said wall when said plug is shifted to said open position for withdrawing the excreta deposited on said wall, said aperture means being shifted out of communication with said wall when said plug is shifted to said closed position.

23. The incubator of claim 22 further characterized in that a sac is removably secured to said flange, said sac having an interior which is communicable with said wall through said plug when the plug is shifted to the open position.

24. An incubator for the housing of small animals and the like, said incubator comprising base means, a horizontally disposed member on said base means, at least one hoop removably secured to said base means and extending upwardly therefrom, a flexible canopy disposed over said hoop and forming an internal chamber with said base means, a horizontally disposed margin on said canopy matching said horizontally disposed member, and adhesive securement means for releasably securing the lower margins of said canopy to said horizontally disposed member on said base means.

25. The incubator of claim 24 further characterized in that said canopy is secured to said base means along the entire lower peripheral margin of said canopy.

26. The incubator of claim 24 further characterized in that said base means has a plurality of sets of cooperating recesses, a plurality of hoops are removably secured to said base means and each of said hoops have terminal portions which extend into a set of recesses.

27. An incubator for the housing of small animals and the like, said incubator comprising base means, a removable canopy disposed over said base means and forming an internal chamber with said base means, a plenum chamber formed in said base means, a support member removably mounted on said base means and having a portion thereof in communication with said plenum chamber, means operatively mounted on said supporting member and extending into said plenum chamber for regulating air of controlled quality, and means forming part of said base means for transferring the air of controlled quality to said internal chamber.

28. The incubator of claim 27 further characterized in that conduit receiving means is operatively attached to said base means for removably receiving air transferring conduit.

29. An incubator for the housing of small animals and the like, said incubator comprising base means, a canopy disposed over said base means forming an internal chamber, means operatively associated with said base means forming a plenum chamber, conditioning means in said plenum chamber for regulating air of controlled quality, means also associated with said base means forming an exhaust chamber, first duct means forming part of said base means and providing fluid communcation between said plenum chamber and internal chamber for introducing the air of controlled quality into said internal chamber, and second duct means forming part of said base means and providing fluid communication between said internal chamber and exhaust chamber enabling removal of the air from said internal chamber to said exhaust chamber.

30. The incubator of claim 29 further characterized in that said first duct means comprises an upstanding element located in said internal chamber and disposed in close proximity to one of the margins of the base means, at least one aperture formed in said element and communicating with said plenum chamber, said aperture facing away from the interior of said internal chamber.

31. The incubator of claim 30 further characterized in that said second duct means comprises an upstanding element located in said internal chamber disposed in close proximity to one of the margins of the base means, at least one aperture formed in said last named element and communicating with said exhaust chamber, said last named aperture facing away from the interior of said internal chamber.

32. An atmosphere generator for the conditioning of air to be used in incubatory processes and the like, said atmosphere generator comprising an outer housing, means forming a first chamber in said housing, air transfer means in said first chamber, means forming a second chamber in said housing, temperature control means in said second chamber, said temperature control means including a first heater having long heat retention characteristics and a second heater having rapid heat dissipation characteristics, means providing communication between said air transfer means and said second chamber, and means for withdrawing the heated air from said housing.

33. The atmosphere generator of claim 32 further characterized in that a humidity control means is disposed in said housing for providing a proper humidity level to the air.

34. An atmosphere generator for the conditioning of air to be used in incubatory processes and the like, said atmosphere generator comprising an outer housing, transfer means enabling an operative connection to at least one animal accommodating chamber, means forming a first chamber in said housing, air transfer means in said first chamber, means forming a second chamber in said housing, temperature control means in said second chamber, means providing communication between said air transfer means and said second chamber, withdrawal means for withdrawing the air from said housing through said transfer means, and valve means operatively associated with said withdrawal means for regulating the quantity of air delivered to said animal accommodating chamber.

35. The atmosphere generator of claim 34 further characterized in that pressure relief means is operatively interposed between said first and second chambers for recirculating the air therebetween on conditions of excess pressure.

36. A control system for gnotobiotic systems and the like wherein the gnotobiotic system includes at least one incubator and an air generator for supplying conditioned air to said incubator; said control system comprising first temperature conditioning means operatively associated with said air generator for producing air of a desired temperature, second temperature conditioning means operatively associated with said incubator for further conditioning the temperature of the air received from said air generator, first control means operatively associated with said first temperature conditioning means, second control means operatively associated with said incubator and said second temperature conditioning means, and control signal means operatively associated with said second control means and initiating a control signal for transmission to said first control means in response to a temperature change in said first incubator, said first control means actuating said first temperature conditioning means in response to recipt of said control signal, said control signal means also being operatively coupled to said second control means for actuating the second control means and second temperature conditioning means.

37. The control system of claim 36 further characterized in that a plurality of incubators are employed and each include a second temperature conditioning means and a second control means.

38. A control system for gnotobiotic systems and the like wherein the gnotobiotic system includes at least one incubator and an air generator for supplying conditioned air to said incubator; said control system comprising first temperature conditioning means operatively associated with said air generator for producing air of a desired temperature, second temperature conditioning means operatively associated with said incubator for further conditioning the temperature of the air received from said air generator, first control means operatively associated with said first temperature conditioning means and actuating same in response to a signal, and second temperature control means operatively associated with said second temperature conditioning means and initiating a signal for transmission to said first control means in response to a temperature change in said incubator, said first temperature conditioning means including first and second heating mechanisms, said first heating mechanism remaining energized in response to receipt of a signal from said second control means and said second heating mechanism being energized and deenergized in response to receipt of a signal from said second control means.

39. The control system of claim 38 further characterized in that a variable power mechanism is operatively associated with said first temperature control means to reduce temperature cycling of said first temperature conditioning means.

40. A transfer station for animal houses and the like which have a canopy forming an internal chamber said transfer station comprising a first sleeve mounted on a chamber wall opening into the interior of said internal chamber and being optionally closable, a second sleeve on said wall opposed to said first sleeve and opening exteriorly of said internal chamber and being optionally closable, and defining a transfer chamber formed between each of said sleeves.

References Cited

UNITED STATES PATENTS

| | | | |
|---|---|---|---|
| 2,244,082 | 6/1941 | Reyniers | 128—1 |
| 2,600,240 | 6/1952 | Grieb | 128—1 |
| 2,881,733 | 4/1959 | Young et al. | 119—15 |
| 2,980,106 | 4/1961 | Carlson | 128—1 |
| 3,042,000 | 7/1962 | McMurray et al. | 119—20 |
| 3,158,150 | 11/1964 | Croasdaile | 128—1 |
| 3,220,383 | 11/1965 | Bruner | 119—17 |
| 3,261,659 | 7/1966 | Schwichtenberg et al. | 21—53 |
| 3,302,615 | 2/1967 | Tietue | 119—15 |
| 3,311,456 | 3/1967 | Denny et al. | 23—2 X |
| 3,337,455 | 8/1967 | Wilson et al. | 23—2 X |

ALDRICH F. MEDBERY, Primary Examiner

U.S. Cl. X.R.

23—2; 119—18; 128—1